US008676876B2

(12) United States Patent
Dekel et al.

(10) Patent No.: US 8,676,876 B2
(45) Date of Patent: *Mar. 18, 2014

(54) SYNCHRONIZING AN ACTIVE FEED ADAPTER AND A BACKUP FEED ADAPTER IN A HIGH SPEED, LOW LATENCY DATA COMMUNICATIONS ENVIRONMENT

(75) Inventors: Eliezer Dekel, Haifa (IL); John J. Duigenan, New York, NY (US); Gidon Gershinsky, Haifa (IL); Alexander Krits, Haifa (IL); Nir Naaman, Haifa (IL); Foluso O. Okunseinde, Austin, TX (US); Hilary A. Pike, College Station, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1780 days.

This patent is subject to a terminal disclaimer.

(21) Appl. No.: 11/426,864

(22) Filed: Jun. 27, 2006

(65) Prior Publication Data
US 2008/0010487 A1 Jan. 10, 2008

(51) Int. Cl.
*G06F 11/20* (2006.01)

(52) U.S. Cl.
USPC .......................................... 709/201; 709/227

(58) Field of Classification Search
USPC ............... 714/4, 100.1–4.2; 709/217–219, 709/227–229; 719/313–317
See application file for complete search history.

(56) References Cited

U.S. PATENT DOCUMENTS

| 4,787,035 | A | 11/1988 | Bourne |
| 4,947,429 | A | 8/1990 | Bestler et al. |
| 5,195,092 | A | 3/1993 | Wilson et al. |
| 5,732,274 | A | 3/1998 | O'Neill |
| 5,809,028 | A | 9/1998 | Nethercott et al. |
| 5,809,337 | A | 9/1998 | Hannah et al. |
| 5,940,843 | A | 8/1999 | Zucknovich et al. |
| 5,987,432 | A | 11/1999 | Zusman et al. |

(Continued)

FOREIGN PATENT DOCUMENTS

| CA | 2649883 | 6/2006 |
| CA | 2650169 | 6/2006 |

(Continued)

OTHER PUBLICATIONS

U.S. Appl. No. 11/780,826, filed Jul. 20, 2007, Berezuk, et al.

(Continued)

*Primary Examiner* — Thai Nguyen
(74) *Attorney, Agent, or Firm* — DeLizio Gilliam, PLLC

(57) ABSTRACT

Methods, apparatus, and products are disclosed for synchronizing an active feed adapter and a backup feed adapter in a high speed, low latency data communications environment that include brokering, by a stream administration server, establishment of an active message stream to a subscribing client device from an active feed adapter, the active message stream capable of communicating active application messages; brokering, by the server, establishment of a backup message stream to the client device from a backup feed adapter, the backup message stream capable of communicating backup application messages; receiving an active feed adapter state in backup messaging middleware of the backup adapter from active messaging middleware of the active adapter; determining, by the backup feed adapter, whether a backup feed adapter state is synchronized with the active feed adapter state; and administering, by the backup feed adapter, operation of the backup adapter in dependence upon the determining.

15 Claims, 8 Drawing Sheets

(56) References Cited

U.S. PATENT DOCUMENTS

| | | | |
|---|---|---|---|
| 6,125,391 A | 9/2000 | Meltzer et al. | |
| 6,141,324 A | 10/2000 | Abbott | |
| 6,160,874 A | 12/2000 | Dickerman et al. | |
| 6,343,321 B2 | 1/2002 | Patki et al. | |
| 6,694,316 B1 | 2/2004 | Langseth et al. | |
| 6,725,446 B1 | 4/2004 | Hahn et al. | |
| 6,757,710 B2 | 6/2004 | Reed | |
| 6,901,428 B1 | 5/2005 | Frazier et al. | |
| 6,910,078 B1 * | 6/2005 | Raman et al. | 709/231 |
| 6,954,454 B1 | 10/2005 | Schuster et al. | |
| 7,113,520 B1 | 9/2006 | Meenan | |
| 7,120,165 B2 | 10/2006 | Kasvand-Harris et al. | |
| 7,225,195 B2 | 5/2007 | Avrahami | |
| 7,283,904 B2 | 10/2007 | Benjamin et al. | |
| 7,415,715 B2 | 8/2008 | Fradkov et al. | |
| 7,448,043 B2 | 11/2008 | Shenfield et al. | |
| 8,549,168 B2 | 10/2013 | Borgendale et al. | |
| 2001/0016783 A1 | 8/2001 | Graumann et al. | |
| 2001/0049743 A1 | 12/2001 | Phippen et al. | |
| 2002/0019812 A1 | 2/2002 | Board et al. | |
| 2002/0022952 A1 | 2/2002 | Zager et al. | |
| 2002/0023040 A1 | 2/2002 | Gilman et al. | |
| 2002/0083097 A1 | 6/2002 | Warrington | |
| 2002/0086688 A1 | 7/2002 | Kang | |
| 2002/0161900 A1 | 10/2002 | Brown et al. | |
| 2002/0169706 A1 | 11/2002 | Chandra et al. | |
| 2002/0172155 A1 | 11/2002 | Kasvand-Harris et al. | |
| 2003/0073406 A1 | 4/2003 | Benjamin et al. | |
| 2003/0115291 A1 | 6/2003 | Kendall et al. | |
| 2003/0115548 A1 | 6/2003 | Melgar | |
| 2003/0158805 A1 | 8/2003 | Mozhdehi | |
| 2003/0204719 A1 | 10/2003 | Ben-Itzhak | |
| 2004/0005744 A1 | 1/2004 | Taniguchi et al. | |
| 2004/0024753 A1 | 2/2004 | Chane et al. | |
| 2004/0024845 A1 | 2/2004 | Fishhaut et al. | |
| 2004/0034591 A1 | 2/2004 | Wailbroeck et al. | |
| 2004/0054744 A1 | 3/2004 | Karamchedu et al. | |
| 2004/0148357 A1 | 7/2004 | Corrigan et al. | |
| 2004/0190459 A1 | 9/2004 | Ueda et al. | |
| 2004/0193703 A1 | 9/2004 | Loewy et al. | |
| 2004/0199524 A1 | 10/2004 | Rys et al. | |
| 2004/0205439 A1 | 10/2004 | Carmeli et al. | |
| 2004/0216135 A1 | 10/2004 | Heimbeck | |
| 2005/0010311 A1 | 1/2005 | Barbazette et al. | |
| 2005/0028195 A1 | 2/2005 | Feinleib et al. | |
| 2005/0028208 A1 | 2/2005 | Ellis et al. | |
| 2005/0044197 A1 | 2/2005 | Lai | |
| 2005/0102218 A1 | 5/2005 | Sargent et al. | |
| 2005/0105533 A1 | 5/2005 | Malolepsy et al. | |
| 2005/0149543 A1 | 7/2005 | Cohen et al. | |
| 2005/0195820 A1 | 9/2005 | Betts et al. | |
| 2005/0222931 A1 | 10/2005 | Mamou et al. | |
| 2005/0246186 A1 | 11/2005 | Nikolov | |
| 2005/0246423 A1 | 11/2005 | Starbuck et al. | |
| 2005/0254508 A1 | 11/2005 | Aksu et al. | |
| 2005/0261923 A1 | 11/2005 | Brown et al. | |
| 2005/0262025 A1 | 11/2005 | Wajih et al. | |
| 2005/0273408 A1 | 12/2005 | Bandman et al. | |
| 2006/0085507 A1 | 4/2006 | Zhao et al. | |
| 2006/0143307 A1 | 6/2006 | Codignotto | |
| 2006/0149840 A1 | 7/2006 | Thompson et al. | |
| 2006/0206440 A1 | 9/2006 | Anderson et al. | |
| 2006/0242240 A1 | 10/2006 | Parker et al. | |
| 2006/0269148 A1 | 11/2006 | Farber et al. | |
| 2007/0038543 A1 | 2/2007 | Weinstein | |
| 2007/0038712 A1 | 2/2007 | Affronti et al. | |
| 2007/0073907 A1 | 3/2007 | Factor et al. | |
| 2007/0091789 A1 * | 4/2007 | Thukral | 370/216 |
| 2007/0106813 A1 | 5/2007 | Bordes et al. | |
| 2007/0150918 A1 | 6/2007 | Carpenter et al. | |
| 2007/0233728 A1 | 10/2007 | Puteick et al. | |
| 2007/0271447 A1 * | 11/2007 | Agarwala et al. | 712/227 |
| 2007/0299936 A1 | 12/2007 | Borgendale et al. | |
| 2007/0299973 A1 | 12/2007 | Borgendale et al. | |
| 2007/0300233 A1 | 12/2007 | Bhogal et al. | |
| 2007/0300234 A1 | 12/2007 | Dekel et al. | |
| 2007/0300235 A1 | 12/2007 | Dekel et al. | |
| 2008/0010487 A1 | 1/2008 | Dekel et al. | |
| 2008/0069141 A1 | 3/2008 | Bonaguro et al. | |
| 2008/0103949 A1 | 5/2008 | Lobana et al. | |
| 2008/0104266 A1 | 5/2008 | Dekel et al. | |
| 2008/0114839 A1 | 5/2008 | Borgendale et al. | |
| 2008/0114938 A1 | 5/2008 | Borgendale et al. | |
| 2008/0137830 A1 | 6/2008 | Bhogal et al. | |
| 2008/0140550 A1 | 6/2008 | Berezuk et al. | |
| 2008/0141272 A1 | 6/2008 | Borgendale et al. | |
| 2008/0141273 A1 | 6/2008 | Borgendale | |
| 2008/0141275 A1 | 6/2008 | Borgendale et al. | |
| 2008/0141276 A1 | 6/2008 | Borgendale et al. | |
| 2008/0243675 A1 | 10/2008 | Parsons et al. | |
| 2008/0244017 A1 | 10/2008 | Gershinsky et al. | |
| 2009/0006559 A1 | 1/2009 | Bhogal et al. | |
| 2009/0006560 A1 | 1/2009 | Bhogal et al. | |
| 2012/0110372 A1 | 5/2012 | Borgendale et al. | |
| 2013/0024502 A1 | 1/2013 | Bhogal et al. | |

FOREIGN PATENT DOCUMENTS

| | | |
|---|---|---|
| EP | 1 039 410 A | 9/2000 |
| EP | 2007/055851 | 6/2007 |
| JP | 2003-163691 A | 6/2003 |
| JP | 2004-274703 A | 9/2004 |
| JP | 2007-209040 A | 8/2007 |
| JP | 2009542141 | 11/2009 |
| JP | 4566273 B | 10/2010 |
| WO | WO 9900753 A1 | 1/1999 |
| WO | WO 2005/045670 A | 5/2005 |
| WO | 2008000625 | 1/2008 |

OTHER PUBLICATIONS

"PCQuote.com Releases PCQuote Oribit", PR Newswire, New York: Nov. 2, 1999. p. 1.
"FirstQuote Provides Financial Information Services for Brokat E-Finance Application", PR newswire, New York: Feb. 21, 2000.
Speakman, et al.; RFC 3208—PGM Reliable Transport Protocol Specification; www.faqs.org; 2001; pp. 1-72; RFC 3208; Network Working Group.
PCT Search Report and Written Opinion, Jun. 5, 2008; PCT Application No. PCT/EP2007/063194.
PCT Search Report and Written Opinion, Feb. 4, 2008; PCT Application No. PCT/EP2007/063239.
PCT Search Report and Written Opinion, Jul. 7, 2008; PCT Application No. PCT/EP2008/053370.
PCT Search Report and Written Opinion, Sep. 14, 2007; PCT Application No. PCT/EP2007/055851.
Office Action Dated Oct. 30, 2008 in U.S. Appl. No. 11/780,826.
Office Action Dated Mar. 19, 2009 in U.S. Appl. No. 11/559,425.
Office Action Dated May 6, 2009 in U.S. Appl. No. 11/559,434.
Office Action Dated May 8, 2009 in U.S. Appl. No. 11/586,076.
Office Action Dated Mar. 6, 2009 in U.S. Appl. No. 11/426,764.
Office Action Dated Feb. 6, 2009 in U.S. Appl. No. 11/567,898.
Office Action Dated Apr. 6, 2009 in U.S. Appl. No. 11/608,904.
Office Action Dated Apr. 14, 2009 in U.S. Appl. No. 11/780,826.
Office Action Dated May 27, 2009 in U.S. Appl. No. 11/426,857.
Office Action Dated Jun. 1, 2009 in U.S. Appl. No. 11/769,240.
Office Action Dated Feb. 24, 2009 in U.S. Appl. No. 11/609,696.
Office Action Dated May 20, 2009 in U.S. Appl. No. 11/426,819.
Office Action Dated Jun. 2, 2009 in U.S. Appl. No. 11/426,864.
Office Action Dated Jun. 22, 2009 in U.S. Appl. No. 11/769,243.
Office Action Dated Jun. 25, 2009 in U.S. Appl. No. 11/426,849.
Final Office Action, U.S. Appl. No. 11/609,604, Apr. 19, 2010.
Office Action, U.S. Appl. No. 11/609,708, Apr. 19, 2010.
Final Office Action, U.S. Appl. No. 11/609,708, Sep. 8, 2010.
Office Action, U.S. Appl. No. 11/426,789, Oct. 6, 2010.
Office Action, U.S. Appl. No. 11/567,357, May 27, 2010.
Final Office Action, U.S. Appl. No. 11/567,357, Oct. 27, 2010.
Final Office Action, U.S. Appl. No. 11/426,849, Aug. 17, 2010.
Office Action, U.S. Appl. No. 11/728,850, Jul. 27, 2010.
Notice of Allowance, U.S. Appl. No. 11/728,850, Nov. 22, 2010.

(56) References Cited

OTHER PUBLICATIONS

Neville, Jennifer et al., "Using Relational Knowledge Discovery to Prevent Securities Fraud", Proceedings of the eleventh ACM SIGKDD international conference on Knowledge discovery in data mining. ACM Press. Aug. 2005, pp. 449-458.

"CA Application No. 2649883 Office Action", Jul. 24, 2013, 7 pages.

* cited by examiner

SYNCHRONIZING AN ACTIVE FEED ADAPTER AND A BACKUP FEED ADAPTER IN A HIGH SPEED, LOW LATENCY DATA COMMUNICATIONS ENVIRONMENT

BACKGROUND OF THE INVENTION

1. Field of the Invention

The field of the invention is data processing, or, more specifically, methods, apparatus, and products for synchronizing an active feed adapter and a backup feed adapter in a high speed, low latency data communications environment.

2. Description of Related Art

Messaging environments are generally available to provide data communication between message sending devices and message receiving devices using application messages. An application message is a quantity of data that includes one or more data fields and is passed from a message producer installed on a message sending device to a message consumer installed on a message receiving device. An application message is a form of message recognized by application software operating in the application layer of a data communication protocol stack—as contrasted for example with a transport message or network message, which are forms of messages recognized in the transport layer and the network layer respectively. An application message may represent, for example, numeric or textual information, images, encrypted information, and computer program instructions.

A messaging environment may support point-to-point messaging, publish and subscribe messaging, or both. In a point-to-point messaging environment, a message producer may address an application message to a single message consumer. In a publish and subscribe messaging environment, a message producer may publish an application message to a particular channel or topic and any message consumer that subscribes to that channel or topic receives the message. Because message producers and message consumers communicate indirectly with each other via a channel or topic in a publish and subscribe environment, message transmission is decoupled from message reception. As a consequence, neither producers nor consumers need to maintain state about each other, and dependencies between the interacting participants are reduced or eliminated. A publish and subscribe environment may, therefore, allow message publishers and message subscribers to operate asynchronously.

For further explanation of a messaging environment, FIG. 1 sets forth a block diagram illustrating a typical messaging environment for data communications that includes a message sending device (100), a message receiving device (104), and a message administration server (102). The message sending device (100) is a computer device having installed upon it a message producer (110), a set of computer program instructions configured for transmitting application messages to the message administration server (102) for delivery to a message receiving device. In the example of FIG. 1, the message producer (110) transmits application messages to the message administration server (102) on a message stream (106). The message sending device (100) may produce the transmitted messages by generating the application messages from data of the message sending device itself or data received from some other source. The message receiving device (104) is a computer device having installed upon it a message consumer (112), a set of computer program instructions configured for receiving application messages from the message administration server (102). In the example of FIG. 1, the message consumer (112) receives the application messages from the message administration server (102) on a message stream (108). In the example of FIG. 1, the message stream (106) and the message stream (108) are data communication channels implemented using, for examples the User Datagram Protocol ('UDP') and the Internet Protocol ('IP').

In either a point-to-point messaging environment or a publish and subscribe messaging environment, the application messages transmitted from message sending devices to message receiving devices typically pass through the message administration server (102). The message administration server (102) is computer device having installed upon it a message administration module (114), computer program instructions configured for administering the messages transmitted from the message producer (110) to the message consumer (112). Examples of message administration modules may include the IBM WebSphere® MQ, the Open Message Queue from Sun Microsystems, and the OpenJMS from The OpenJMS Group. In a point-to-point messaging environment, the message administration module (114) provides message queuing for the message consumer (112) as the message administration module (114) receives application messages addressed to the consumer (112) from various message providers. In a publish and subscribe messaging environment, the message administration module (114) administers the various channels or topics to which message producers publish and message consumers subscribe. In either message environment, the message administration module (114) may also provide security services to ensure that the only messages arriving at the messaging consumer (112) from the message producer (110) are those messages that the message consumer (112) is authorized to receive and that the message producer (110) is authorized to send. Moreover, the message administration module (114) may also coordinate providing to the message consumer backup messages from a backup message producer in the event that a failure occurs on the message producer (110).

Current messaging environments such as, for example, the one described above with reference to FIG. 1, have certain drawbacks. Application messages transmitted to a message administration server from a message sending device for delivery to a message receiving device are delayed in the message administration server until the message administration server can process the messages. The message processing that occurs in the message administration server increases the overall messaging latency of the messaging environment and decreases the overall speed for transmitting data in the data communications environment. Messaging latency is the time period beginning when a message producer transmits an application message and ending when a message consumer receives the application message.

In many data communication environments, even slight increases in messaging latency are costly. Consider, for example, a financial market data environment. A financial market data environment is a data processing environment used to communicate information about financial markets and participants in financial markets. In a financial market data environment, an application message is commonly referred to as a 'tick' and represents financial market data such as, for example, financial quotes or financial news. Financial quotes include bid and ask prices for any given financial security. A 'bid' refers to the highest price a buyer is willing to pay for a security. An 'ask' refers to the lowest price a seller is willing to accept for a security. In a financial market data environment, a message producer may provide quotes for the purchase or sale of financial securities based on real-time financial market conditions, and a message consumer may buy and sell financial securities based on financial quotes. When a message consumer buys or sells a financial security based on the quoted price provided by the message producer, the ability of a message consumer to obtain the bid or ask in the quote for the financial security is largely influenced by messaging latency in the financial market data environment. The higher the messaging latency, the less likely a buy or sell order generated by the message consumer will execute at or near the price stated in the financial quote. In fact, a highly volatile security may fluctuate in price dramatically over a time period of a few seconds.

Current solutions to reduce messaging latency are to remove the message administration server from the messaging environment. In such current solutions, the message sending devices send application messages directly to message receiving devices. The drawback to such current solutions is that removing the message administration server removes the administration functionality provided by the message administration server from the messaging environment. Current solutions, therefore, effectively offer no solution in messaging environments where the administrative functions of a message administration server are required. Consider again the financial market data environment example from above. In such an exemplary financial market data environment, consider that a message receiving device is only authorized to receive financial quotes on certain financial securities or only authorized to receive financial quotes that are at least fifteen minutes old. Removing the message administration server from such a financial market data environment removes the ability to administer the messages received by the message receiving device from the message sending device in the financial market data environment.

An additional drawback to current messaging environments, such as, for example, the one describe above with reference to FIG. 1, involves the situation in which a message administration server receives application messages from both an active message sending device and a backup message sending device to provide redundancy in the event that the active message sending device should fail. Failover from the active messaging sending device to the backup message sending device in current messaging environments often takes many seconds and results in substantial increases in overall messaging latency. As such, there is a vast need for improvement in the current art.

SUMMARY OF THE INVENTION

Methods, apparatus, and products are disclosed for synchronizing an active feed adapter and a backup feed adapter in a high speed, low latency data communications environment that include brokering, by a stream administration server, establishment of an active message stream to a subscribing client device from an active feed adapter, the active feed adapter characterized by an active feed adapter state, the active message stream capable of communicating active application messages to the subscribing client device, each active application message characterized by an active source stream sequence number and an active message sequence number; brokering, by the stream administration server, establishment of a backup message stream to the subscribing client device from a backup feed adapter, the backup feed adapter characterized by a backup feed adapter state, the backup message stream capable of communicating backup application messages representing duplicates of the active application messages to the subscribing client device, each backup application message characterized by a backup source stream sequence number and a backup message sequence number; receiving the active feed adapter state in backup messaging middleware of the backup feed adapter from active messaging middleware of the active feed adapter; determining, by the backup feed adapter, whether the backup feed adapter state is synchronized with the active feed adapter state; and administering, by the backup feed adapter, operation of the backup feed adapter in dependence upon whether the backup feed adapter state is synchronized with the active feed adapter state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
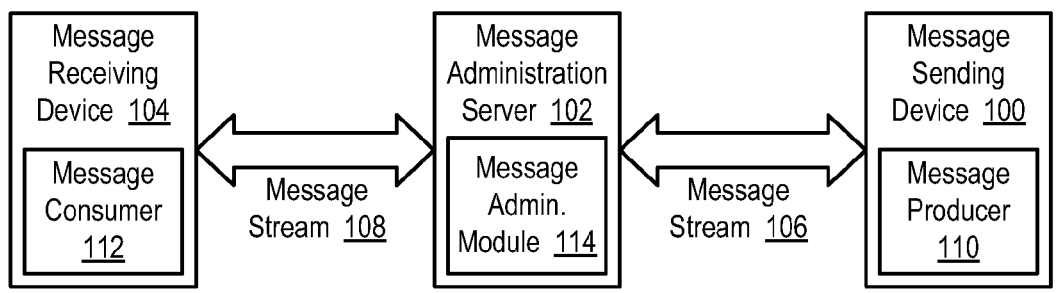
FIG. 1 sets forth a block diagram illustrating a typical messaging environment for data communications.
Figure 2:
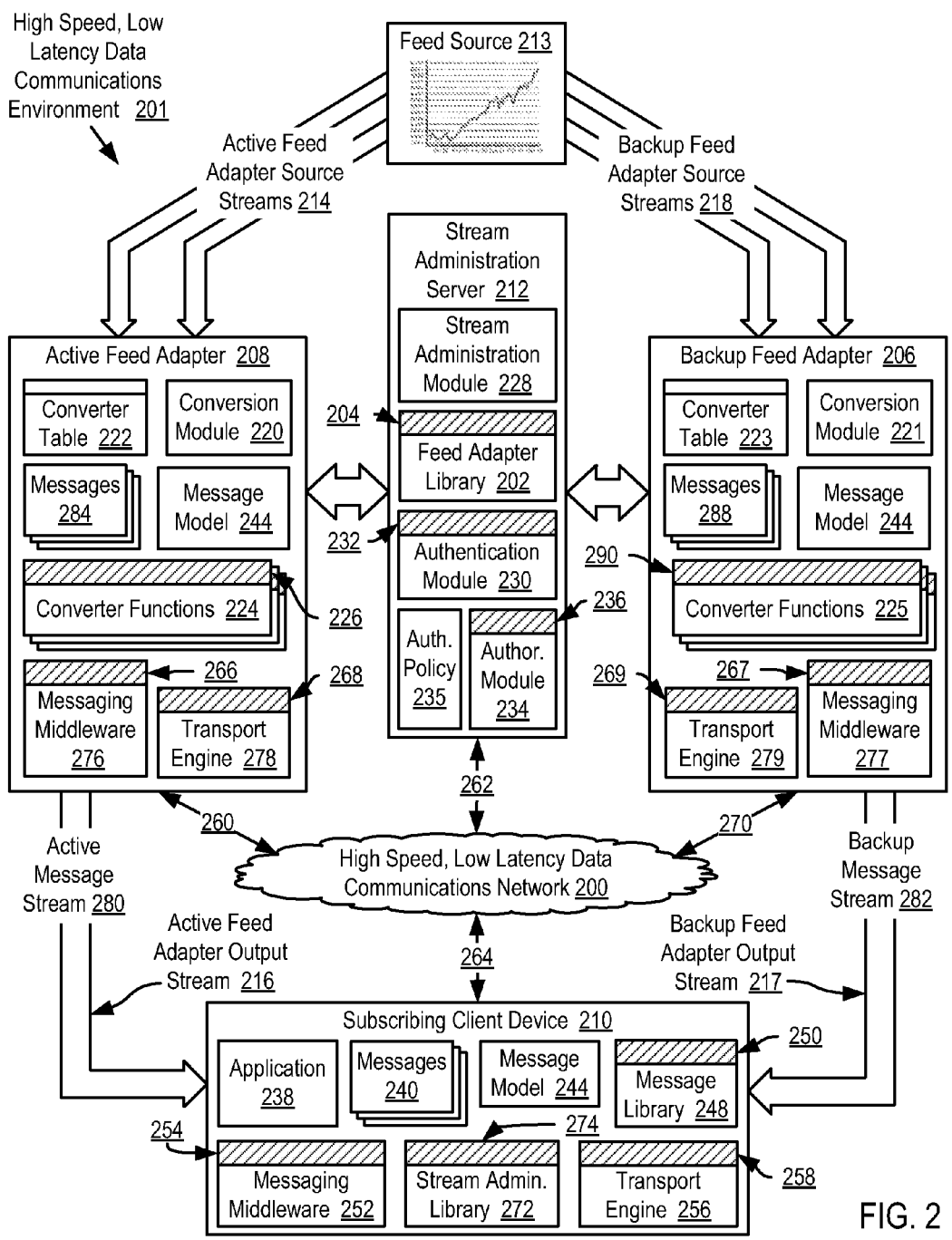
FIG. 2 sets forth a network and block diagram illustrating an exemplary computer data processing system for synchronizing an active feed adapter and a backup feed adapter in a high speed, low latency data communications environment according to exemplary embodiments of the present invention.

Exemplary methods, apparatus, and products for synchronizing an active feed adapter and a backup feed adapter in a high speed, low latency data communications environment according to embodiments of the present invention are described with reference to the accompanying drawings, beginning with FIG. 2. FIG. 2 sets forth a network and block diagram illustrating an exemplary computer data processing system for synchronizing an active feed adapter and a backup feed adapter in a high speed, low latency data communications environment (201) according to embodiments of the present invention. The system of FIG. 2 operates generally for synchronizing an active feed adapter and a backup feed adapter in a high speed, low latency data communications environment according to embodiments of the present invention as follows: A stream administration server (212) brokers establishment of an active message stream (280) to a subscribing client device (210) from an active feed adapter (208) wherein the active feed adapter (208) is characterized by an active feed adapter state. A feed adapter state is an aggregation of values in computer memory that a feed adapter uses to perform data processing at any given moment. The active message stream (280) is capable of communicating active application messages to the subscribing client device (210) wherein each active application message is characterized by an active source stream sequence number and an active message sequence number. The stream administration server (212) brokers establishment of a backup message stream (282) to the subscribing client device (210) from a backup feed adapter (206) wherein the backup feed adapter (206) is characterized by a backup feed adapter state. The backup message stream (282) is capable of communicating backup application messages that represent duplicates of the active application messages to the subscribing client device. Each backup application message is characterized by a backup source stream sequence number and a backup message sequence number. Backup messaging middleware (277) of the backup feed adapter (206) receives the active feed adapter state from active messaging middleware (276) of the active feed adapter (208). The backup feed adapter (206) determines whether the backup feed adapter state is synchronized with the active feed adapter state. The backup feed adapter (206) administers operation of the backup feed adapter (206) in dependence upon whether the backup feed adapter state is synchronized with the active feed adapter state.

The high speed, low latency data communications environment (201) illustrated in FIG. 2 includes a high speed, low latency data communications network (200). The network (200) includes an active feed adapter (208), a backup feed adapter (206) a stream administration server (212), and a subscribing client device (210), as well as the infrastructure for connecting such devices (206, 208, 212, 210) together for data communications. The network (200) of FIG. 2 is termed 'high speed, low latency' because the application messages sent between devices connected to the network (200) on message streams administered by the stream administration server (212) bypass the stream administration server (212). For example, the application messages on the active message stream (280) from the active feed adapter (208) to the subscribing client device (210) bypass the stream administration server (212). Similarly, the application messages on the backup message stream (282) from the backup feed adapter (206) to the subscribing client device (210) bypass the stream administration server (212). Although such messages are not delayed for processing in the stream administration server (212), the stream administration server (212) retains administration of the streams (280, 282) between devices connected to the high speed, low latency data communications network (200).

Further contributing to the 'high speed, low latency' nature of network (200), readers will note that the network (200) does not include a router, that is a computer networking device whose primary function is to forward data packets toward their destinations. Rather, each device (206, 208, 212, 210) provides its own routing functionality for data communication through a direct connection with the other devices connected to the network (200). Because the network (200) does not include a computer networking device dedicated to routing data packets, the network (200) of FIG. 2 may be referred to as a 'minimally routed network.' Although the exemplary network (200) illustrated in FIG. 2 does not include a router, such a minimally routed network is for explanation only. In fact, some high speed, low latency networks useful in synchronizing an active feed adapter and a backup feed adapter in a high speed, low latency data communications environment according to embodiments of the present invention may include a router.

As mentioned above, the high speed, low latency data communications environment (201) depicted in FIG. 2 includes two message streams (280, 282). A message stream is a data communication channel between a communications endpoint of a sending device and a communications endpoint of at least one receiving device. A communications endpoint is composed of a network address and a port for a sending device or a receiving device. A message stream may be implemented as a multicast data communication channel. In a multicast data communication channel, a one-to-many relationship exists between a destination address for a message and the communication endpoints of receiving devices. That is, each destination address identifies a set of communication endpoints for receiving devices to which each message of the stream is replicated. A multicast data communication channel may be implemented using, for example, the User Datagram Protocol ('UDP') and the Internet Protocol ('IP'). In addition to a multicast data communication channel, the message stream may be implemented as a unicast data communication channel. In a unicast data communication channel, a one-to-one relationship exists between a destination address for a message and a communication endpoint of a receiving device. That is, each destination address uniquely identifies a single communication endpoint of single receiving device. A unicast data communication channel may be implemented using, for example, the Transmission Control Protocol ('TCP') and IP.

The exemplary system of FIG. 2 includes a stream administration server (212) connected to the high speed, low latency data communications network (200) through a wireline connection (262). The stream administration server (212) of FIG. 2 is a computer device having installed upon it a stream administration module (228), a feed adapter library (202), an authentication module (230), an authorization module (234), and an authorization policy (235). A stream administration module (228) is a set of computer program instructions configured for synchronizing an active feed adapter and a backup feed adapter in a high speed, low latency data communications environment according to embodiments of the present invention. The stream administration module (228) operates generally for synchronizing an active feed adapter and a backup feed adapter in a high speed, low latency data communications environment according to embodiments of the present invention by brokering establishment of an active message stream (280) to a subscribing client device (210) from an active feed adapter (208) and brokering establishment of a backup message stream (282) to the subscribing client device (210) from a backup feed adapter (206). In addition, the stream administration module (228) may administer the message streams by providing security services such as authenticating the subscribing client device (210) and authorizing the subscribing client device (210) to receive application messages from the feed adapters (206, 208) on the message streams (280, 282).

The communications between the stream administration module (228) and the feed adapters (206, 208) may be implemented using a feed adapter library (202). The feed adapter library (202) is a set of functions contained in dynamically linked libraries or statically linked libraries available to the stream administration module (228) through a feed adapter library API (204). Through the feed adapter library (202), the stream administration module (228) of the stream administration server (212) may administer the feed adapters (206, 208), including providing to the feed adapters (206, 208) the request for a message stream from a subscribing client device. Functions of the feed adapter library (202) used by the stream administration module (228) may communicate with the active feed adapter (208) through network (200) by calling member methods of a CORBA object, calling member methods of remote objects using the Java Remote Method Invocation ('RMI') API, using web services, or any other communication implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ('IDL'), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java RMI allows a Java client to access a remote Java object just like any other local Java object.

In addition to administering the feed adapters (206, 208), the stream administration module (228) of FIG. 2 administers the message streams by providing security services such as, for example, authenticating the subscribing client device (210) and authorizing the subscribing client device (210) to receive application messages from the feed adapters (206, 208) on the message streams (280, 282). The authentication module (230) of FIG. 2 is a set of computer program instructions capable of providing authentication security services to the stream administration module (228) through an exposed authentication application programming interface ('API') (232). Authentication is a process verifying the identity of an entity. In the exemplary system of FIG. 2, the authentication module (230) verifies the identity of the subscribing client device (210). The authentication module (230) may provide authentication security services using a variety of security infrastructures such as, for example, shared-secret key infrastructure or a public key infrastructure.

The authorization module (234) of FIG. 2 is a set of computer program instructions capable of providing authorization security services to the stream administration module (228) through an exposed authorization API (236). Authorization is a process of only allowing resources to be used by resource consumers that have been granted authority to use the resources. In the example of FIG. 2, the authorization module (234) identifies the application messages that the subscribing client device (210) is authorized to receive on the message streams (280, 282). The authorization module (234) of FIG. 2 provides authorization security services using an authorization policy (235). The authorization policy (235) is a set of rules governing the privileges of authenticated entities to send or receive application messages on a message stream. In a financial market data environment, for example, an authenticated entity may be authorized to receive application messages that include financial quotes for some financial securities but not other securities. The authorization policy (235) may grant privileges on the basis of an individual entity or an entity's membership in a group.

In the exemplary system of FIG. 2, active feed adapter (208) is connected to the high speed, low latency data communications network (200) through a wireline connection (260). The active feed adapter (208) is a computer device having the capabilities of converting application messages on active feed adapter source streams (214) having a first format to application messages on a active feed adapter output stream (216) having a second format and transmitting the application messages on the active feed adapter output stream (216) to subscribing client devices. The active feed adapter source streams (214) of FIG. 2 are message streams from a feed source to the active feed adapter (208). The active feed adapter output stream (216) of FIG. 2 is a message stream administered by the stream administration server (212) from the active feed adapter (208) to the subscribing client device (210). Although the active feed adapter receives application messages having a first format on the active feed adapter source streams (214) and transmits application messages having a second format on the active feed adapter output stream (216), readers will note that application messages received on a feed adapter source stream are referred to in this specification as 'source stream messages' to distinguish such messages from the application messages transmitted to a subscribing client device on a feed adapter output stream.

In the example of FIG. 2, the active feed adapter (208) receives active source stream messages on the active feed adapter source streams (214) from a feed source (213). The feed source (213) is a computer device capable of aggregating data into source stream messages and transmitting the messages to a feed adapter on one or more feed adapter source streams. In a financial market data environment, for example, a feed source (213) may be implemented as a feed source controlled by the Options Price Reporting Authority ('OPRA'). OPRA is the securities information processor for financial market information generated by the trading of securities options in the United States. The core information that OPRA disseminates is last sale reports and quotations. Other examples of feed sources in financial market data environment may include feed sources controlled by the Consolidated Tape Association ('CTA') or The Nasdaq Stock Market, Inc. The CTA oversees the dissemination of realtime trade and quote information in New York Stock Exchange and American Stock Exchange listed securities. The Nasdaq Stock Market, Inc. operates the NASDAQ Market Center$^{SM}$ which is an electronic screen-based equity securities market in the United States. In a financial market data environment, a feed adapter source stream is referred to as a 'financial market data feed.'

Readers will note that FIG. 2 illustrates two active feed adapter source streams (214). Each feed adapter source stream (214) of FIG. 2 is identified in the active feed adapter by an active source stream identifier. The feed source (213) of FIG. 2 may transmit source stream messages to the active feed adapter (208) using more than one feed adapter source stream because the bandwidth required to transmit the messages on a single source stream is not available. In a financial market data environment, for example, a feed source may transmit ticks for financial securities whose ticker symbol begins with the letters 'A' through 'M' on one message stream and transmit ticks for the financial securities that begin with the letters 'N' through 'Z' on another message stream.

The active feed adapter (208) of FIG. 2 has installed upon it a conversion module (220), a converter table (222), converter functions (224), messages (284), message model (244), messaging middleware (276), and a transport engine (278). The conversion module (220) is a software component that includes computer program instructions configured for converting source stream messages received on the active feed adapter source streams (214) having a first format into application messages having a second format for transmission to subscribing devices on the active feed adapter output stream (216). The conversion module (220) also includes computer program instructions configured for maintaining, accessing, and modifying an active feed adapter state such as, for example, an active message conversion application state and an active message conversion application health state.

The active message conversion application state is an aggregation of the values stored in computer memory of the active feed adapter used by the conversion module (220) to convert source stream messages received on a source stream to application messages for transmission on an output stream. The conversion module (220) of FIG. 2 may add the values of the active message conversion application state to source stream messages to create application messages or may use the values of the active message conversion application state to perform administrative services. Often the active message conversion application state includes calculated values derived from a series of source stream messages. In a financial market data environment, for example, the active message conversion application state may include values that represent the daily trading volume of a security, the highest price at which a security traded for the day, or the lowest price at which a security traded for the day.

The active message conversion application health state is one or more metrics of the active feed adapter used by the active feed adapter or some other feed adapter to evaluate the relative performance of the active feed adapter compared to the other feed adapter. The active message conversion application health state may be implemented as a measurement of the available computer memory on the active feed adapter, the processor usage on the active feed adapter, the error count for the active feed adapter, message transmission rate for the active feed adapter, or any other metric as will occur to those of skill in the art.

The conversion module (220) converts application messages from the first format to the second format according to the converter table (222). The converter table (222) of FIG. 2 is a table that specifies the converter functions (224) capable of converting an application message from one format to another format. Utilizing multiple converter tables, the conversion module (220) may convert messages from a variety of input formats to a variety of output formats. In the example of FIG. 2, the converter table (222) specifies the converter functions (224) capable of converting the active source stream messages received from the active feed adapter source streams (214) having the first format to application messages having the second format for transmission to subscribing client devices on the active feed adapter output stream (216). The converter table (222) of FIG. 2 may be implemented using a structured document such as, for example, an eXtensible Markup Language ('XML') document.

The converter functions (224) of FIG. 2 are functions capable of converting data fields in an application message from one format to another format or converting values of data fields from one value to another value. Converter functions (224) may, for example, convert a 16-bit integer to a 32-bit integer, convert a number stored in a string field to a 64-bit double floating point value, increase the value of a particular data field by one, or any other conversion as will occur to those of skill in the art. The conversion module (220) of FIG. 2 accesses the converter functions (224) through a set of converter function APIs (226) exposed by the converter functions (224).

In the example of FIG. 2, conversion module (220) uses the converter functions (224) to convert active source stream messages to active application messages (284). The application messages (284) of FIG. 2 represent the active application messages for transmission to the subscribing client device (210). The format of the messages (284) is specified in the message model (244). The message model (244) is metadata that defines the structure and the format of the messages (284). The message model (244) may be attached to and transmitted along with the application messages (284) to the subscribing client device (210). More often, however, the subscribing client device (210) and the feed adapters (206, 208) may receive the message model (244) or its identifier from the stream administration server (212) when the stream administration server (212) brokers the message stream (280). A message model may be implemented using a structured document, such as, for example, an XML document, a Java object, C++ object, or any other implementation as will occur to those of skill in the art.

Before the conversion module (220) of FIG. 2 performs data processing on the source stream messages, the conversion module (220) receives the source stream messages from the feed source (213). The conversion module (220) of FIG. 2 may receive the source stream messages through a receiving transport engine (not shown) of the active feed adapter (208). The receiving transport engine is a software module that operates in the transport layer of the network stack and may be implemented according to the TCP/IP protocols, UDP/IP protocols, or any other data communication protocol as will occur to those of skill in the art. The receiving transport engine may provide the received source stream messages directly to the conversion module (220) or to the messaging middleware (276), which in turn, provides the source stream messages to the conversion module.

After the conversion module (220) of FIG. 2 performs data processing on the application messages received from the feed source (213), the conversion module (220) provides the application messages to the messaging middleware (276). The messaging middleware (276) of FIG. 2 is a software component that includes computer program instructions configured for administering the application messages received from the conversion module (220) and providing the application messages to the transport engine (278) for transmission to a subscribing client device on the active feed adapter output stream (216). The conversion module (220) interacts with the messaging middleware (276) through a messaging middleware API (266) exposed by the messaging middleware (276).

In addition to administering the application messages, the messaging middleware (276) of FIG. 2 also provides high availability services between the active feed adapter (208), the backup feed adapter (206), and the subscribing client device (210) and provides synchronization services between the active feed adapter (208) and the backup feed adapter (206). Such synchronization services include transmitting the active feed adapter state to the backup feed adapter. Messaging middleware (276) of FIG. 2 provides synchronization services through a data communications channel between the active feed adapter (208) and the backup feed adapter (206) using, for example, member methods of an RMI object, member methods of a CORBA object, web services, or any other communication implementation as will occur to those of skill in the art.

As mentioned above, the active feed adapter state is an aggregation of values in computer memory that an active feed adapter uses to perform data processing at any given moment. The active feed adapter state may include, for example, the active message conversion application state or the active message conversion application health state discussed above. The active feed adapter state may, however, include other values used in data processing such as, for example, an active message stream state. The active message stream state is the state of the active message stream (280) from the active feed adapter (208) to the subscribing client device (210). The active message stream state may be characterized by a value for the active message sequence number and a value for the active source stream sequence number of the next active application message in the active messaging middleware (276) for transmission to the subscribing client device (210).

The message stream states of two feed adapters may be used to determine whether messages streams from two feed adapters are synchronized by comparing the values for the message sequence number and the source stream sequence number of each message stream state. A source stream sequence number uniquely identifies the content of a particular application message. Two messages with the same source stream sequence number have the same content. Each application message transmitted by a feed adapter, regardless of the message's content, is assigned a message sequence number. A backup message stream is considered 'synchronized' with an active message stream when identical message sequence numbers of the messages on both streams refer to messages with the same content. That is, the messages streams are referred to as 'synchronized' when the combination of values for the active message sequence number and the active source stream sequence number of the active message stream state match the combination of values for the backup message sequence number and the backup source stream sequence number of the backup message stream state.

The transport engine (278) of FIG. 2 is a software component operating in the transport and network layers of the OSI protocol stack promulgated by the International Organization for Standardization. The transport engine (278) provides data communications services between network-connected devices. The transport engine may be implemented according to the UDP/IP protocols, TCP/IP protocols, or any other data communications protocols as will occur to those of skill in the art. The transport engine (278) includes a set of computer program instructions capable of encapsulating the application messages provided by the messaging middleware (276) into packets and transmitting the packets through the active message stream (280) to the subscribing client device (210). The messaging middleware (276) operates the transport engine (278) through a transport API (268) exposed by the transport engine (278).

In the exemplary system of FIG. 2, backup feed adapter (206) is connected to the high speed, low latency data communications network (200) through a wireline connection (270). The backup feed adapter (206) is a computer device having the capabilities of converting backup messages on backup feed adapter source streams (218) having a first format to backup messages on a backup feed adapter output stream (217) having a second format and transmitting the backup messages on the backup feed adapter output stream (217) to subscribing client devices. The backup feed adapter source streams (218) are message streams from the feed source (213) to the backup feed adapter (206). The backup feed adapter output stream (217) is a message stream administered by the stream administration server (212) from the backup feed adapter (206) to the subscribing client device (210).

The backup feed adapter (206) of FIG. 2 has installed upon it a conversion module (221), a converter table (223), converter functions (225) that expose converter function APIs (290), backup application messages (288) for transmission from the backup feed adapter (206) to the subscribing client device (210), message model (244), messaging middleware (277) that exposes messaging middleware API (267), and a transport engine (279) that exposes a transport engine API (269). The components installed on the backup feed adapter (206) operate in a manner similar to the components installed on the active feed adapter (208).

In addition, the messaging middleware (277) of the backup feed adapter (206) of FIG. 2 includes a set of computer program instructions for synchronizing an active feed adapter and a backup feed adapter in a high speed, low latency data communications environment according to embodiments of the present invention. The messaging middleware (277) of FIG. 2 operates generally for synchronizing an active feed adapter and a backup feed adapter in a high speed, low latency data communications environment according to embodiments of the present invention by receiving the active feed adapter state from active messaging middleware of the active feed adapter; determining whether the backup feed adapter state is synchronized with the active feed adapter state; administering operation of the backup feed adapter in dependence upon whether the backup feed adapter state is synchronized with the active feed adapter state; and receiving the backup message conversion application health state of each of a plurality of backup feed adapters. For example, the messaging middleware (277) of the backup feed adapter may receive the active message stream state from the active feed adapter, determine whether the active message stream state matches the backup message stream state, and set the backup message stream state to match the active message stream state.

Similar to the messaging middleware (277), the conversion module (221) of the backup feed adapter (206) in the example of FIG. 2 also includes a set of computer program instructions for synchronizing an active feed adapter and a backup feed adapter in a high speed, low latency data communications environment according to embodiments of the present invention. The conversion module (221) of FIG. 2 operates generally for synchronizing an active feed adapter and a backup feed adapter in a high speed, low latency data communications environment according to embodiments of the present invention by determining whether the backup feed adapter state is synchronized with the active feed adapter state and administering operation of the backup feed adapter in dependence upon whether the backup feed adapter state is synchronized with the active feed adapter state. For example, the conversion module (221) of the backup feed adapter may receive the active message conversion application state from the messaging middleware of the backup feed adapter, determine whether the active message conversion application state matches the backup message conversion application state, and set the backup message conversion application state to match the active message conversion application state.

The subscribing client device (210) in exemplary system of FIG. 2 connects to the high speed, low latency data communications network (200) through a wireline connection (264). The subscribing client device (210) of FIG. 2 is a computer device capable of subscribing to the message streams transmitted by various feed adapters. In a financial market data environment, for example, a subscribing client device may subscribe to a tick to receive the bid and ask prices for a particular security on a message stream provided by a feed adapter controlled by a financial securities broker.

In the example of FIG. 2, the subscribing client device (210) has installed upon it an application (238), a message library (248), a stream administration library (272), messaging middleware (252), and a transport engine (256). The application (238) of FIG. 2 is a software component that processes data contained in the application messages (240) received from one of the feed adapters (208, 206). The application (238) may process the data for utilization by the subscribing client device (210) itself, for contributing the data to another feed adapter, or for contributing the data to some other device. In a financial market data environment, the application installed on the subscribing client device may be a program trading application that buys or sells financial securities based on the quoted prices contained in ticks. The application may also be a value-adding application that contributes information to a tick such as, for example, the best bid and ask prices for a particular security, that is not typically included in the ticks provided by the feed source (213). The subscribing client device may then transmit the ticks to a feed adapter for resale to other subscribing client devices.

In the example of FIG. 2, the application messages (240) represent application messages received from one of the feed adapters (206, 208) and having a format specified by the message model (244). The application (238) of FIG. 2 processes the data contained in the application messages (240) using the message library (248). The message library (248) is a set of functions that are computer program instructions for creating, accessing, and manipulating messages (240) according to the message model (244). The message library (248) is accessible to the application (238) through a message API (250) exposed by the message library (248).

The communications between the subscribing client device (210) and the stream administration server (212) may be implemented using a stream administration library (272). The stream administration library (272) is a set of functions contained in dynamically linked libraries or statically linked libraries available to the application (238) through a stream administration library API (274). Through the stream administration library (272), the application (238) of the subscribing client device (210) may, for example, request to subscribe to messages from a feed adapter, modify an existing message subscription, or cancel a message subscription. Functions of the stream administration library (272) used by the application (238) may communicate with the stream administration server (212) through the network (200) by calling member methods of a CORBA object, calling member methods of remote objects using the Java RMI API, using web services, or any other communication implementation as will occur to those of skill in the art.

Before the application (238) processes the data contained in the messages (240), the application (238) receives the messages (240) from the messaging middleware (252), which, in turn, receives the application messages (240) from one of the feed adapter (208, 206) through the transport engine (256). The messaging middleware (252) is a software component that provides high availability services between the subscribing client device, the active feed adapter (208), and the backup feed adapter (206). In addition, the messaging middleware (252) provides message administration services for the stream administration server (212). Such message administration services may include restricting the ability of the application (238) to send and receive messages on a message stream to messages that satisfy certain constraints. The application (238) and the stream administration library (272) interact with the messaging middleware (252) through a messaging middleware API (254).

The transport engine (256) of FIG. 2 is a software component operating in the transport and network layers of the OSI protocol stack promulgated by the International Organization for Standardization. The transport engine (256) provides data communications services between network-connected devices. The transport engine may be implemented according to the UDP/IP protocols, TCP/IP protocols, or any other data communications protocols as will occur to those of skill in the art. The transport engine (256) includes a set of computer program instructions for receiving packets through the message streams (280, 282) from the feed adapters (208, 206), unencapsulating the application messages from the received packets, and providing the application messages to the messaging middleware (252). The messaging middleware (252) operates the transport engine (256) through a transport API (258) exposed by the transport engine (256).

The servers and other devices illustrated in the exemplary system of FIG. 2 are for explanation, not for limitation. Devices useful in synchronizing an active feed adapter and a backup feed adapter in a high speed, low latency data communications environment according to embodiments of the present invention may be implemented using general-purpose computers, such as, for example, computer servers or workstations, hand-held computer devices, such as, for example, Personal Digital Assistants ('PDAs') or mobile phones, or any other automated computing machinery configured for data processing according to embodiments of the present invention as will occur to those of skill in the art.

The arrangement of servers and other devices making up the exemplary system illustrated in FIG. 2 are for explanation, not for limitation. Although the connections to the network (200) of FIG. 2 are depicted and described in terms of wireline connections, readers will note that wireless connections may also be useful according to various embodiments of the present invention. Furthermore, data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 2.

Synchronizing an active feed adapter and a backup feed adapter in a high speed, low latency data communications environment in accordance with the present invention in some embodiments may be implemented with one or more subscribing client devices, stream administration servers, and feed adapters, computers, that is, automated computing machinery. For further explanation, therefore, FIG. 3 sets forth a block diagram of automated computing machinery comprising an example of a subscribing client device (210) useful in synchronizing an active feed adapter and a backup feed adapter in a high speed, low latency data communications environment according to embodiments of the present invention. The subscribing client device (210) of FIG. 3 includes at least one computer processor (156) or 'CPU' as well as random access memory (168) ('RAM') which is connected through a high speed memory bus (166) and bus adapter (158) to processor (156) and to other components of the subscribing client device.

Stored in RAM (168) are an application (238), application messages (240), message model (244), a message library (248), a messaging middleware (252), a stream administration library (272), and a transport engine (256). Each application message (240) is a quantity of data that includes one or more data fields and is transmitted from one device to another on a message stream. Application messages are typically created and processed by applications operating in application layers above the network and transport layers of a network protocol stack. As mentioned above, an application message may represent numeric or textual information, images, encrypted information, computer program instructions, and so on. In a financial market data environment, for example, a message is commonly referred to as a 'tick' and represents financial market data such as, for example, financial quotes or financial news. Each application message (240) may be implemented using a structured document such as, far example, an XML document, a Java object, C++ object, or any other implementation as will occur to those of skill in the art. The message model (244) is metadata that defines the structure and format of the messages (240). The message model (244) may also be implemented using a structured document such as, for example, an XML document, a Java object, C++ object, or any other implementation as will occur to those of skill in the art. The application (238), the message library (248), the messaging middleware (252), the stream administration library (272), and the transport engine (256) illustrated in FIG. 3 are software components, that is computer program instructions, that operate as described above with reference to FIG. 2.

Also stored in RAM (168) is an operating system (154). Operating systems useful in subscribing client devices according to embodiments of the present invention include UNIX™, Linux™, Microsoft NT™, IBM's AIX™, IBM's i5/OS™, and others as will occur to those of skill in the art. The operating system (154), the application (238), the messages (240), the message model (244), the message library (248), the messaging middleware (252), and the transport engine (256) in the example of FIG. 3 are shown in RAM (168), but many components of such software typically are stored in non-volatile memory also, for example, on a disk drive (170).

Figure 3:
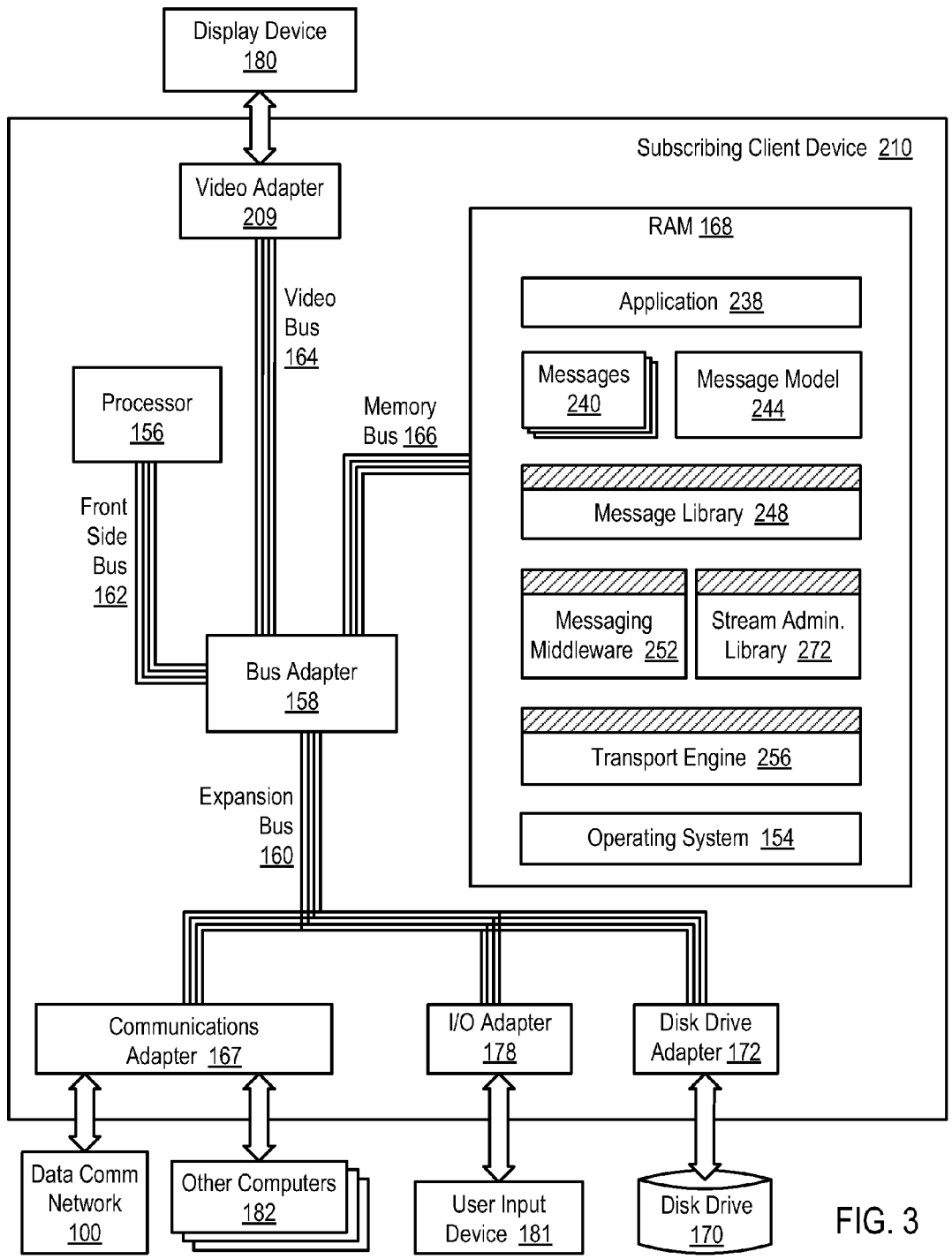
FIG. 3 sets forth a block diagram of automated computing machinery comprising an example of a subscribing client device useful in synchronizing an active feed adapter and a backup feed adapter in a high speed, low latency data communications environment according to exemplary embodiments of the present invention.

The exemplary subscribing client device (210) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in subscribing client devices useful according to embodiments of the present invention include the Intel Northbridge, the Intel Memory Controller Hub, the Intel Southbridge, and the Intel I/O Controller Hub. Examples of expansion buses useful in subscribing client devices useful according to embodiments of the present invention may include Peripheral Component Interconnect ('PCI') buses and PCI Express ('PCIe') buses.

The exemplary subscribing client device (210) of FIG. 3 also includes disk drive adapter (172) coupled through expansion bus (160) and bus adapter (158) to processor (156) and other components of the exemplary subscribing client device (210). Disk drive adapter (172) connects non-volatile data storage to the exemplary subscribing client device (210) in the form of disk drive (170). Disk drive adapters useful in subscribing client devices include Integrated Drive Electronics ('IDE') adapters, Small Computer System Interface ('SCSI') adapters, and others as will occur to those of skill in the art. In addition, non-volatile computer memory may be implemented for a subscribing client device as an optical disk drive, electrically erasable programmable read-only memory (so-called 'EEPROM' or 'Flash' memory), RAM drives, and so on, as will occur to those of skill in the art.

The exemplary subscribing client device (210) of FIG. 3 includes one or more input/output ('I/O') adapters (178). I/O adapters in subscribing client devices implement user-oriented input/output through, for example, software drivers and computer hardware for controlling output to display devices such as computer display screens, as well as user input from user input devices (181) such as keyboards and mice. The exemplary subscribing client device (210) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary subscribing client device (210) of FIG. 3 includes a communications adapter (167) for data communications with other computers (182) and for data communications with a high speed, low latency data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for synchronizing an active feed adapter and a backup feed adapter in a high speed, low latency data communications environment according to embodiments of the present invention include modems for wired dial-up communications, IEEE 802.3 Ethernet adapters for wired data communications network communications, and IEEE 802.11b adapters for wireless data communications network communications.

Although FIG. 3 is discussed with reference to exemplary subscribing client devices, readers will note that automated computing machinery comprising exemplary stream administration servers and exemplary feed adapters useful in synchronizing an active feed adapter and a backup feed adapter in a high speed, low latency data communications environment according to embodiments of the present invention are similar to the exemplary subscribing client device (210) of FIG. 3. That is, such exemplary stream administration servers and feed adapters include one or more processors, bus adapters, buses, RAM, video adapters, communications adapters, I/O adapters, disk drive adapters, and other components similar to the exemplary subscribing client device (210) of FIG. 3 as will occur to those of skill in the art.

Figure 4:
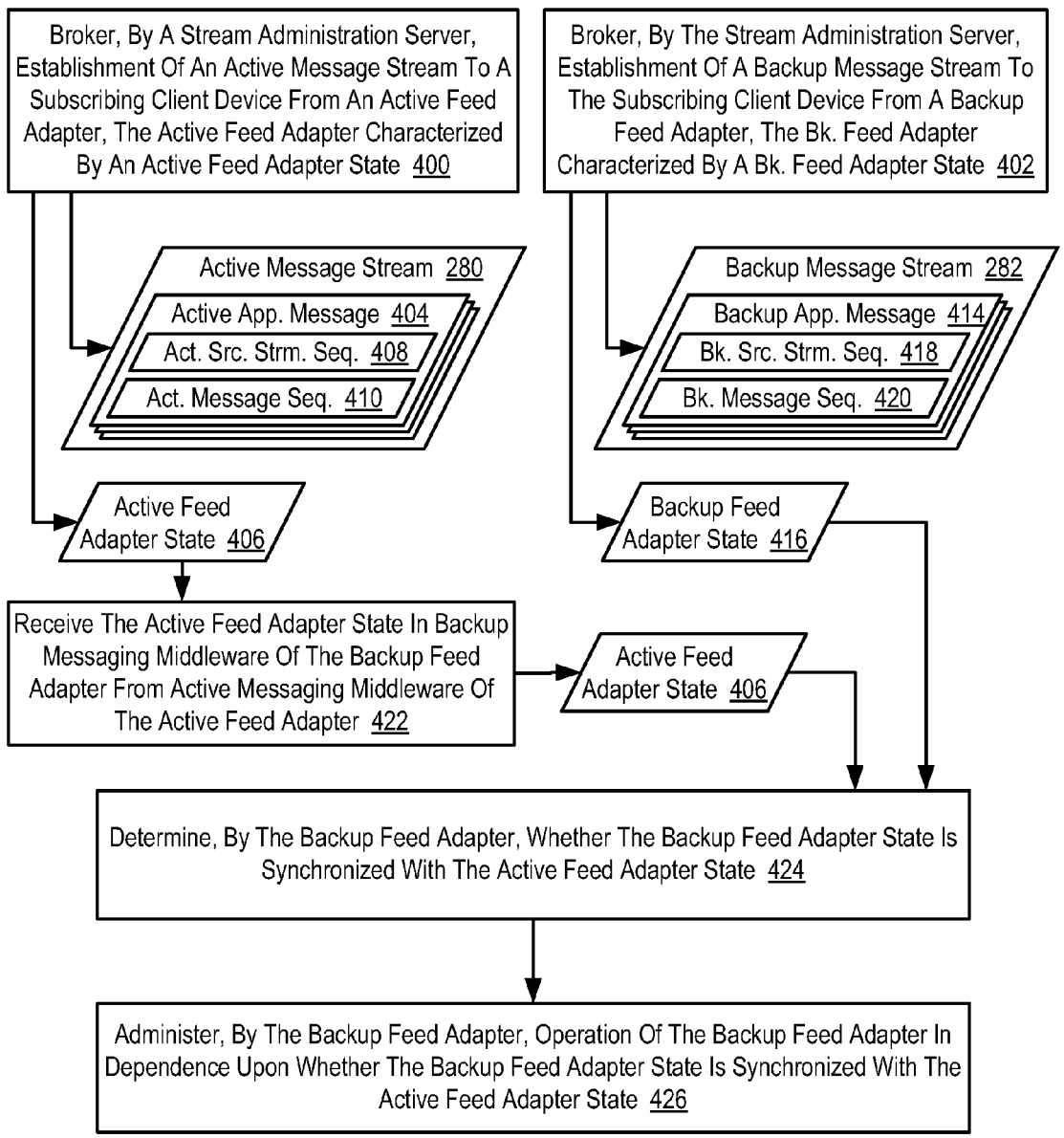
FIG. 4 sets forth a flowchart illustrating an exemplary method for synchronizing an active feed adapter and a backup feed adapter in a high speed, low latency data communications environment according to exemplary embodiments of the present invention.

For further explanation, FIG. 4 sets forth a flowchart illustrating an exemplary method for synchronizing an active feed adapter and a backup feed adapter in a high speed, low latency data communications environment according to embodiments of the present invention. The method of FIG. 4 includes brokering (400), by a stream administration server, establishment of an active message stream (280) to a subscribing client device from an active feed adapter. The active feed adapter is characterized by an active feed adapter state (406). The active feed adapter state (406) of FIG. 4 represents the values in computer memory that specify a particular state of the active feed adapter. The active feed adapter state may include, for example, an active message stream state, an active message conversion application state, or an active message conversion application health state as described above.

The active message stream (280) of FIG. 4 represents a data communication channel between a communications endpoint of a subscribing client device and a communications endpoint of a feed adapter. A message stream may be implemented as a multicast data communication channel using the UDP/IP protocols or a unicast data communication channel using TCP/IP protocols as discussed above with reference to FIG. 2. The active message stream (280) is capable of communicating active application messages (404) from the active feed adapter to the subscribing client device. Each active application message (404) represents an application message for transmission by the active feed adapter to the subscribing client device on the active message stream (280).

Each active application message (404) of FIG. 4 is characterized by an active source stream sequence number (408) and an active message sequence number (410). The active source stream sequence number (408) of FIG. 4 represents the sequence number that uniquely identifies the source stream message received by the active feed adapter that was converted in to the active application message (404) among other active source stream messages received by the active feed adapter on the same source stream. The active source stream sequence number (408) also provides the relative transmission order for a particular active source stream message with respect to the other active source stream messages received in the active feed adapter.

The active message sequence number (410) of FIG. 4 represents a sequence number that uniquely identifies the active application message among other application messages for transmission from a particular active feed adapter to a subscribing client device. Similar to the active source stream sequence number (408), the active message sequence number (410) provides the relative transmission order for a particular active application message with respect to the other active application messages transmitted from the active feed adapter.

In the method of FIG. 4, brokering (400), by a stream administration server, establishment of an active message stream (280) to a subscribing client device from an active feed adapter may be carried out by receiving a subscription request from a subscribing client device to subscribe to messages from a feed adapter. The subscription request may be implemented as an XML document, a call to a member method of a RMI object on the subscribing client device, or any other implementation as will occur to those of skill in the art. The subscription request may include topics of the messages that the subscribing client device requests to receive from the feed adapter. A topic represents the characteristics of the messages that the subscribing client device requests. Using a topic, a subscribing client device may specify the group of messages for receipt from the feed adapter. In a financial market data environment, for example, a subscribing client device may use a topic to request ticks from an OPRA feed source that contains quotes of an IBM option traded on the Chicago Board Options Exchange ('CBOE') that includes the best bid and best ask for the IBM option on the CBOE.

Brokering (400), by a stream administration server, establishment of an active message stream (280) to a subscribing client device from an active feed adapter according to the method of FIG. 4 may also include providing the subscribing client device a destination address for the feed adapter. The destination address for the feed adapter is a multicast address or a unicast address used by the subscribing client device to listen for messages from a feed adapter. Using the destination address provided by the stream administration server, the subscribing client device may establish the active message stream (280) from the feed adapter to the subscribing client device.

Before the stream administration server provides the destination address for the feed adapter, the stream administration server in the example of FIG. 4 may perform several security services to ensure that the subscribing client device only receives messages from the feed adapter for which the subscribing client device is authorized to receive. In the method of FIG. 4, brokering (400), by a stream administration server, establishment of an active message stream (280) to a subscribing client device from an active feed adapter may also be carried out by authenticating the subscribing client device and authorizing the subscribing client device to receive messages from the feed adapter on the message stream (280). Authenticating the subscribing client device may be carried out by verifying client security credentials provided by the subscribing client device with the subscription request. The client security credentials may be implemented as a digital signature in a public key infrastructure, a security token, or any other security data as will occur to those of skill in the art for authenticating the identity of the originator of the subscription request. Authorizing the subscribing client device to receive messages from the feed adapter on the message stream (280) may be carried out by identifying the privileges associated with the authenticated subscribing client device in dependence upon an authorization policy. An authorization policy is a set of rules governing the privileges of authenticated subscribing client devices requesting to receive data from a feed adapter.

The method of FIG. 4 also includes brokering (402), by the stream administration server, establishment of a backup message stream (282) to the subscribing client device from a backup feed adapter. The backup feed adapter is characterized by a backup feed adapter state (416). The backup feed adapter state (416) of FIG. 4 represents the values in computer memory that specify a particular state of the backup feed adapter. Similar to the active feed adapter state, the backup feed adapter state may include, for example, a backup message stream state, a backup message conversion application state, or a backup message conversion application health state. In the method of FIG. 4, brokering (402), by the stream administration server, establishment of a backup message stream (282) to the subscribing client device from a backup feed adapter may be carried out in a manner similar to brokering (400), by a stream administration server, establishment of an active message stream (280) to a subscribing client device from an active feed adapter as described above.

The backup message stream (282) of FIG. 4 represents a data communication channel between a communications endpoint of a subscribing client device and a communications endpoint of a feed adapter. The backup message stream (282) is capable of communicating backup application messages (414) that represent duplicates of the active application messages (404) from the backup feed adapter to the subscribing client device. Each backup application message (414) represents an application message for transmission by the backup feed adapter to the subscribing client device on the backup message stream (282).

Each backup application message (414) of FIG. 4 is characterized by a backup source stream sequence number (418) and a backup message sequence number (420). The backup source stream sequence number (418) of FIG. 4 represents the sequence number that uniquely identifies the source stream message received by the backup feed adapter that was converted in to the backup application message (414) among other backup source stream messages received by the backup feed adapter on the same source stream. The backup source stream sequence number (418) also provides the relative transmission order for a particular backup source stream message with respect to the other backup source stream messages received in the backup feed adapter.

The backup message sequence number (420) of FIG. 4 represents a sequence number that uniquely identifies the backup application message among other application messages for transmission from a particular backup feed adapter to a subscribing client device. Similar to the backup source stream sequence number (418), the backup message sequence number (420) provides the relative transmission order for a particular backup application message with respect to the other backup application messages transmitted from the backup feed adapter.

The method of FIG. 4 also includes receiving (422) the active feed adapter state in backup messaging middleware of the backup feed adapter from active messaging middleware of the active feed adapter. Receiving (422) the active feed adapter state in backup messaging middleware of the backup feed adapter from active messaging middleware of the active feed adapter according to the method of FIG. 4 may include retrieving, by the active messaging middleware, the active feed adapter state and transmitting, by the active messaging middleware to the backup messaging middleware, the active feed adapter state through a data communications channel implemented using, for example, member methods of an RMI object, member methods of a CORBA object, web services, or any other implementation as will occur to those of skill in the art. The active messaging middleware may obtain the active feed adapter state from values stored in the active message middleware itself or from a message conversion application of the active feed adapter.

The method of FIG. 4 also includes determining (424), by the backup feed adapter, whether the backup feed adapter state (416) is synchronized with the active feed adapter state (406). Determining (424), by the backup feed adapter, whether the backup feed adapter state (416) is synchronized with the active feed adapter state (406) according to the method of FIG. 4 may be carried out by determining whether the active message stream state matches the backup message stream state, and determining whether the values for the active message conversion application state match the values for the backup message conversion application state (706) as discussed below with reference to FIGS. 5 and 7.

The method of FIG. 4 also includes administering (426), by the backup feed adapter, operation of the backup feed adapter in dependence upon whether the backup feed adapter state is synchronized with the active feed adapter state. Administering (426), by the backup feed adapter, operation of the backup feed adapter in dependence upon whether the backup feed adapter state is synchronized with the active feed adapter state may be carried out by setting the values for the backup message stream state to match the values for the active message stream state if the backup feed adapter state is not synchronized with the active feed adapter state, reducing a backup stream transmission rate of the backup feed adapter if the backup feed adapter has previously transmitted a backup application message having a value for the backup source sequence number that matches the value for the active source sequence number of the active message stream state, setting the values for the backup message conversion application state to match the values for the active message conversion application state if the backup feed adapter state is not synchronized with the active feed adapter state, and failing one of a plurality of backup feed adapters in dependence upon the backup message conversion application health state (804) of each backup feed adapter if the backup feed adapter state is not synchronized with the active feed adapter state as discussed below with reference to FIGS. 5, 6, 7, and 8.

Figure 5:
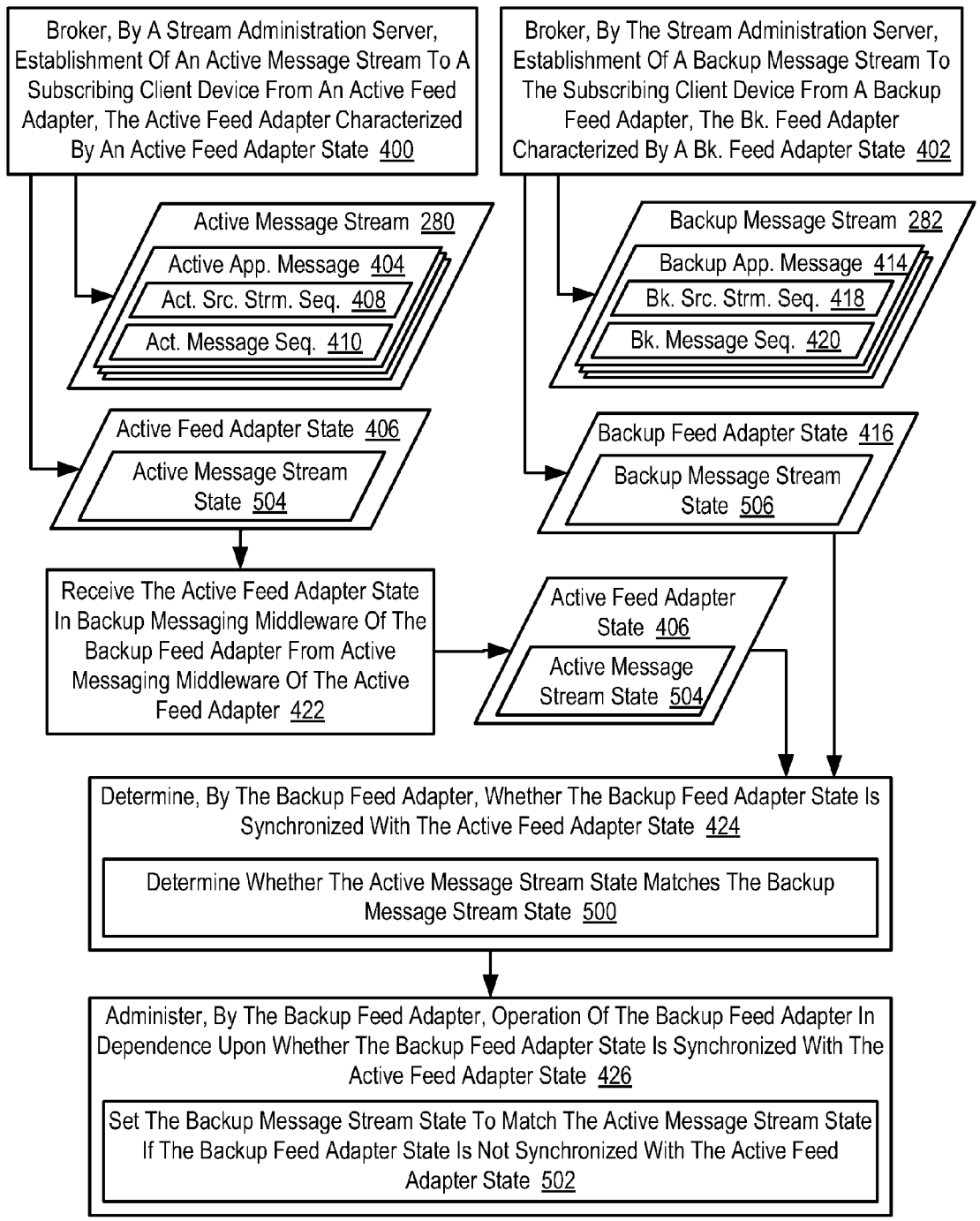
FIG. 5 sets forth a flowchart illustrating a further exemplary method for synchronizing an active feed adapter and a backup feed adapter in a high speed, low latency data communications environment according to exemplary embodiments of the present invention.

For further explanation, therefore, FIG. 5 sets forth a flowchart illustrating a further exemplary method for synchronizing an active feed adapter and a backup feed adapter in a high speed, low latency data communications environment according to embodiments of the present invention that includes setting (502) the backup message stream state (506) to match the active message stream state (504) if the backup feed adapter state (506) is not synchronized with the active feed adapter state (504). The method of FIG. 5 is similar to the method of FIG. 4 in that the method of FIG. 5 includes brokering (400), by a stream administration server, establishment of an active message stream (280) to a subscribing client device from an active feed adapter, brokering (402), by the stream administration server, establishment of a backup message stream (282) to the subscribing client device from a backup feed adapter, receiving (422) the active feed adapter state in backup messaging middleware of the backup feed adapter from active messaging middleware of the active feed adapter, determining (424), by the backup feed adapter, whether the backup feed adapter state (416) is synchronized with the active feed adapter state (406), and administering (426), by the backup feed adapter, operation of the backup feed adapter in dependence upon whether the backup feed adapter state is synchronized with the active feed adapter state.

The example of FIG. 5 is also similar to the example of FIG. 4 in that the active feed adapter of FIG. 5 is characterized by an active feed adapter state (406), the active message stream (280) is capable of communicating active application messages (404) to the subscribing client device, each active application message (404) is characterized by an active source stream sequence number (408) and an active message sequence number (410), the backup feed adapter of FIG. 5 is characterized by a backup feed adapter state (416), the backup message stream (282) is capable of communicating backup application messages (414) representing duplicates of the active application messages (404) to the subscribing client device, and each backup application message (414) is characterized by a backup source stream sequence number (418) and a backup message sequence number (420).

In the example of FIG. 5, the active feed adapter state (504) includes an active message stream state (504). The active message stream state (504) represents the state of the active message stream (280) from the active feed adapter to the subscribing client device. The active message stream state (504) of FIG. 5 is characterized by a value for the active message sequence number and a value for the active source stream sequence number of the next active application message in the active messaging middleware for transmission to the subscribing client device. Messaging middleware of an active feed adapter may identify the next active application message for transmission to the subscribing client device by retrieving the value for the active message sequence number from a data field or register that stores the active message sequence number of the next application message to be processed by the active feed adapter for transmission.

In the example of FIG. 5, the backup feed adapter state (506) includes a backup message stream state (506). The backup message stream state (506) of FIG. 5 represents the state of the backup message stream (282) from the backup feed adapter to the subscribing client device. The backup message stream state (506) of FIG. 5 is characterized by a value for the backup message sequence number and a value for the backup source stream sequence number of the next backup application message in the backup messaging middleware for transmission to the subscribing client device. Messaging middleware of a backup feed adapter may identify the next backup application message for transmission to the subscribing client device by retrieving the value for the backup message sequence number from a data field or register that stores the backup message sequence number of the next application message to be processed by the backup feed adapter for transmission.

In the method of FIG. 5, determining (424), by the backup feed adapter, whether the backup feed adapter state (416) is synchronized with the active feed adapter state (406) includes determining (500) whether the active message stream state (504) matches the backup message stream state (506). Determining (500) whether the active message stream state (504) matches the backup message stream state (506) according to the method of FIG. 5 may be carried out by comparing the values for the active message sequence number and the active source stream sequence number of active message stream state (504) with the values for the backup message sequence number and the backup source stream sequence number of backup message stream state (506). If the combination of values for the active message sequence number and the active source stream sequence number of active message stream state (504) matches the combination of values for the backup message sequence number and the backup source stream sequence number of backup message stream state (506), then the backup feed adapter state (416) is synchronized with the active feed adapter state (406). The backup feed adapter state (416) is not synchronized with the active feed adapter state (406) if the combination of values for the active message sequence number and the active source stream sequence number of active message stream state (504) does not match the combination of values for the backup message sequence number and the backup source stream sequence number of backup message stream state (506).

In the method of FIG. 5, administering (426), by the backup feed adapter, operation of the backup feed adapter in dependence upon whether the backup feed adapter state is synchronized with the active feed adapter state includes setting (502) the backup message stream state (506) to match the active message stream state (504) if the backup feed adapter state (506) is not synchronized with the active feed adapter state (504). Setting (502) the backup message stream state (506) to match the active message stream state (504) according to the method of FIG. 5 may be carried out by adjusting a message sequence number counter so that the backup feed adapter assigns the value of the active message sequence number of the active message stream state (504) to the backup message sequence number of the backup application message (414) having the same value for the backup source stream sequence number (418) as the active source stream sequence number of the active message stream state (504) if the backup feed adapter has not previously transmitted the backup application message (414) having the same value for the backup source stream sequence number (418) as the active source stream sequence number. The message sequence number counter is the logic in the backup messaging middleware that generates the next backup message sequence number that will be assigned to an application message.

Figure 6:
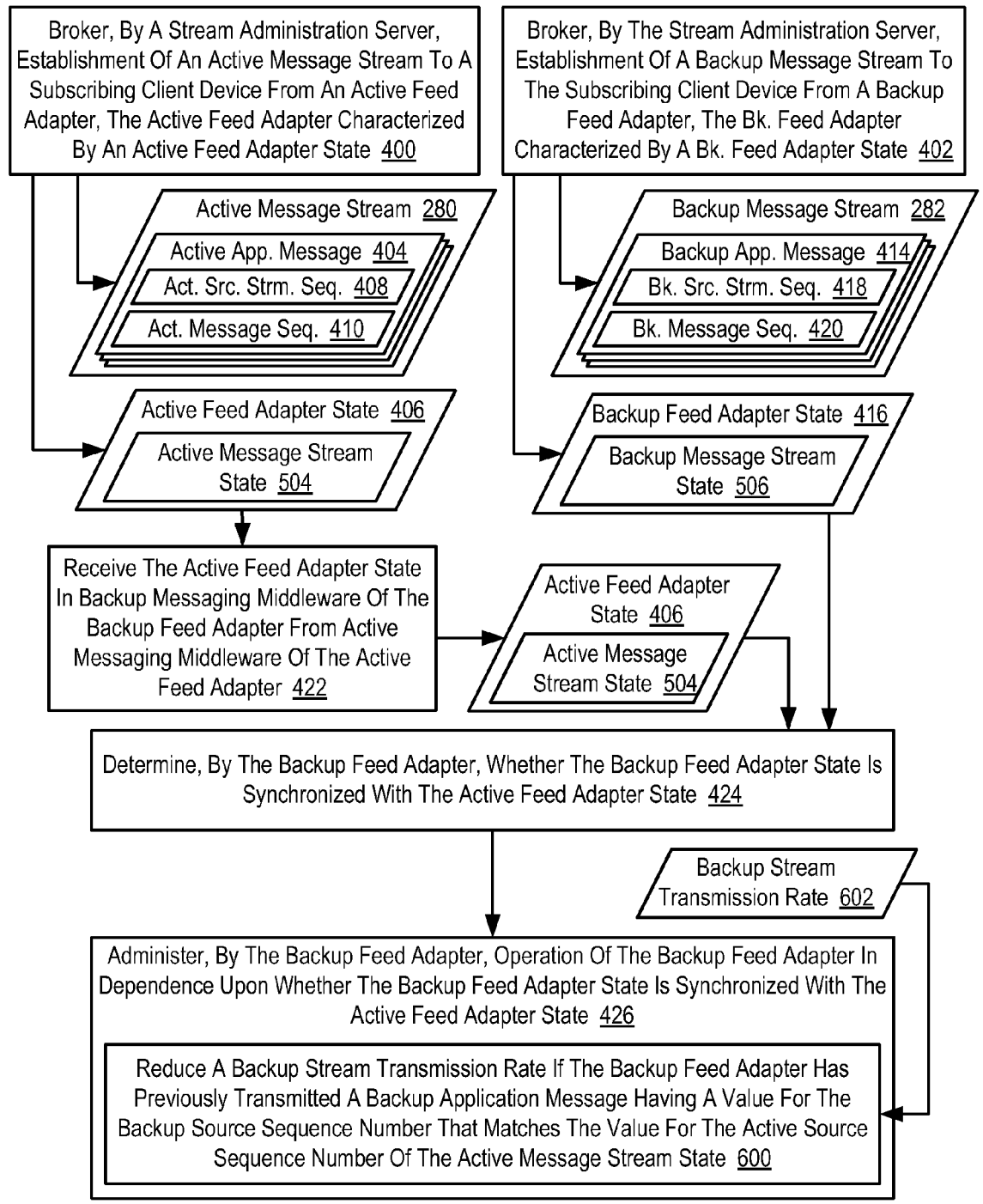
FIG. 6 sets forth a flowchart illustrating a further exemplary method for synchronizing an active feed adapter and a backup feed adapter in a high speed, low latency data communications environment according to exemplary embodiments of the present invention.

When the backup feed adapter has previously transmitted the backup application message having the same value for the backup source stream sequence number as the active source stream sequence number, administering operation of the backup feed adapter may be carried out by reducing a backup stream transmission rate of the backup feed adapter. For further explanation, therefore, FIG. 6 sets forth a flowchart illustrating a further exemplary method for synchronizing an active feed adapter and a backup feed adapter in a high speed, low latency data communications environment according to embodiments of the present invention in which administering (426) operation of the backup feed adapter includes reducing (600) a backup stream transmission rate (602) of the backup feed adapter if the backup feed adapter has previously transmitted a backup application message having a value for the backup source sequence number that matches the value for the active source sequence number of the active message stream state. In the example of FIG. 6, the backup stream transmission rate (602) represents the number of backup application messages that the backup feed adapter transmits to the subscribing client device over a period of time. The backup stream transmission rate (602) may be expressed in units of, for example, messages per second.

In the example of FIG. 6, reducing (600) a backup stream transmission rate (602) of the backup feed adapter if the backup feed adapter has previously transmitted a backup application message having a value for the backup source sequence number that matches the value for the active source sequence number of the active message stream state may be carried out by repeated pausing transmission of backup application messages for a predetermined time period. The backup feed adapter may pause transmission after transmitting each backup application message, after transmitting every other backup application message, or any other frequency as will occur to those of skill in the art. Reducing the backup stream transmission rate of the backup feed adapter allows the active feed adapter to get ahead of the backup feed adapter in the transmission sequence for sending messages to the subscribing client device. When the active feed adapter gets ahead of the backup feed adapter in the transmission sequence, the backup feed adapter may, again, determine whether the active message stream state matches the backup message stream state and set the backup message stream state to match the active message stream state if the backup feed adapter state is not synchronized with the active feed adapter state as discussed above with reference to the method of FIG. 5.

The other steps in the method of FIG. 6 operate in a manner similar to the method of FIG. 5. The method of FIG. 6 includes brokering (400), by a stream administration server, establishment of an active message stream (280) to a subscribing client device from an active feed adapter, brokering (402), by the stream administration server, establishment of a backup message stream (282) to the subscribing client device from a backup feed adapter, receiving (422) the active feed adapter state in backup messaging middleware of the backup feed adapter from active messaging middleware of the active feed adapter, determining (424), by the backup feed adapter, whether the backup feed adapter state (416) is synchronized with the active feed adapter state (406), administering (426), by the backup feed adapter, operation of the backup feed adapter in dependence upon whether the backup feed adapter state is synchronized with the active feed adapter state. The example of FIG. 6 is also similar to the example of FIG. 5 in that the active feed adapter of FIG. 6 is characterized by an active feed adapter state (406) that includes an active message stream state (504), the active message stream (280) is capable of communicating active application messages (404) to the subscribing client device, each active application message (404) is characterized by an active source stream sequence number (408) and an active message sequence number (410), the backup feed adapter of FIG. 6 is characterized by a backup feed adapter state (416) that includes a backup message stream state (506), the backup message stream (282) is capable of communicating backup application messages (414) representing duplicates of the active application messages (404) to the subscribing client device, and each backup application message (414) is characterized by a backup source stream sequence number (418) and a backup message sequence number (420).

As mentioned above, administering operation of the backup feed adapter in dependence upon whether the backup feed adapter state is synchronized with the active feed adapter state may be carried out by setting values for the backup message conversion application state to match values for the active message conversion application state if the backup feed adapter state is not synchronized with the active feed adapter state. For further explanation, therefore, FIG. 7 sets forth a flowchart illustrating a further exemplary method for synchronizing an active feed adapter and a backup feed adapter in a high speed, low latency data communications environment according to embodiments of the present invention that includes setting (702) the values for the backup message conversion application state (706) to match the values for the active message conversion application state (704) if the backup feed adapter state (416) is not synchronized with the active feed adapter state (406).

Figure 7:
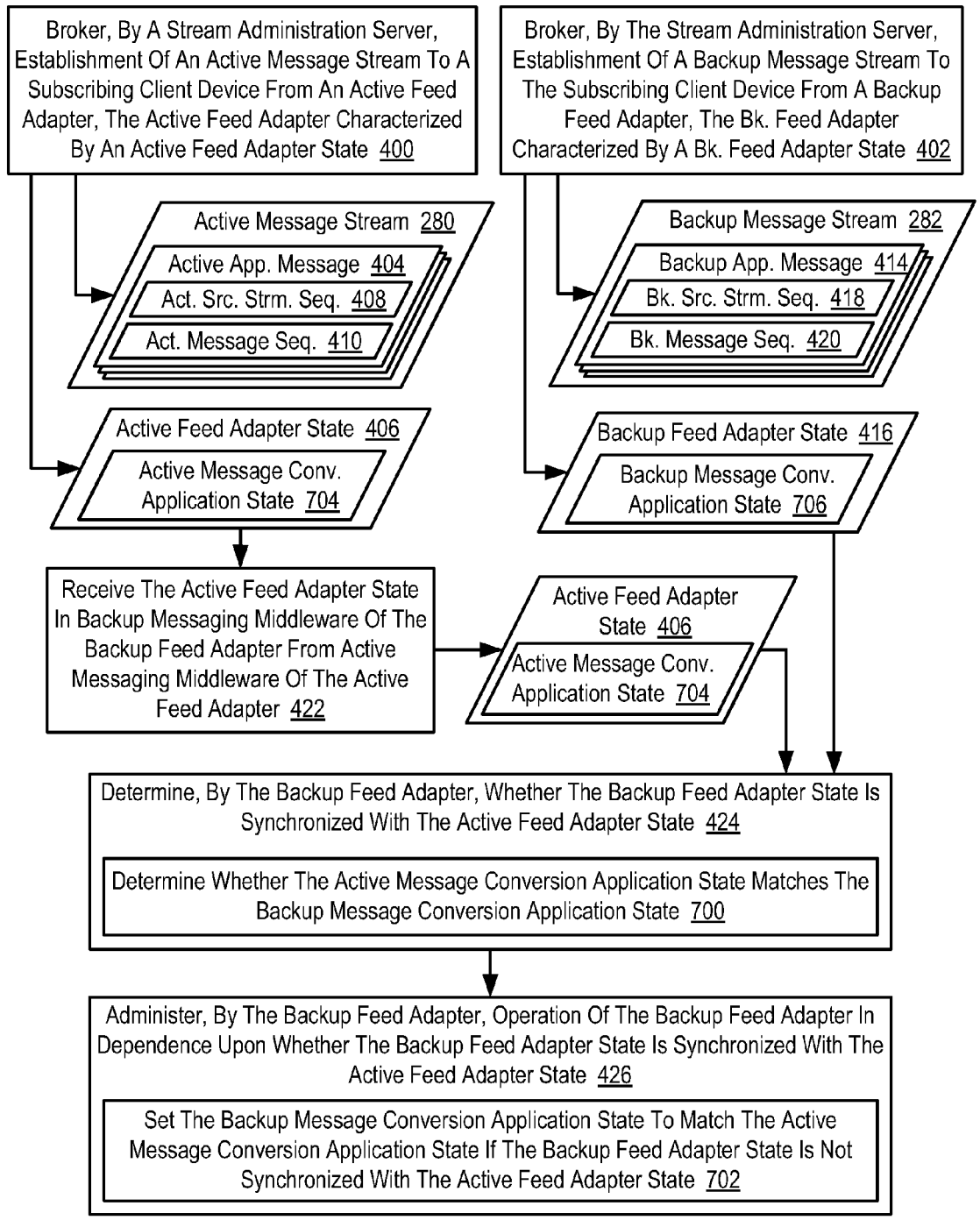
FIG. 7 sets forth a flowchart illustrating a further exemplary method for synchronizing an active feed adapter and a backup feed adapter in a high speed, low latency data communications environment according to exemplary embodiments of the present invention.

The method of FIG. 7 is similar to the method of FIG. 4 in that the method of FIG. 7 includes brokering (400), by a stream administration server, establishment of an active message stream (280) to a subscribing client device from an active feed adapter, brokering (402), by the stream administration server, establishment of a backup message stream (282) to the subscribing client device from a backup feed adapter, receiving (422) the active feed adapter state in backup messaging middleware of the backup feed adapter from active messaging middleware of the active feed adapter, determining (424), by the backup feed adapter, whether the backup feed adapter state (416) is synchronized with the active feed adapter state (406), and administering (426), by the backup feed adapter, operation of the backup feed adapter in dependence upon whether the backup feed adapter state is synchronized with the active feed adapter state. The example of FIG. 7 is also similar to the example of FIG. 4 in that the active feed adapter of FIG. 7 is characterized by an active feed adapter state (406), the active message stream (280) is capable of communicating active application messages (404) to the subscribing client device, each active application message (404) is characterized by an active source stream sequence number (408) and an active message sequence number (410), the backup feed adapter of FIG. 7 is characterized by a backup feed adapter state (416), the backup message stream (282) is capable of communicating backup application messages (414) representing duplicates of the active application messages (404) to the subscribing client device, and each backup application message (414) is characterized by a backup source stream sequence number (418) and a backup message sequence number (420).

In the example of FIG. 7, the active feed adapter state (406) includes an active message conversion application state (704) of an active message conversion application of the active feed adapter. As mentioned above, the active message conversion application state (704) represents an aggregation of values stored in computer memory of the active feed adapter used by an active message conversion application to convert source stream messages received in the feed adapter to application messages for transmission to the subscribing client device An example of an active message conversion application may include the conversion module of the active feed adapter discussed above with reference to FIG. 2. The active message conversion application may add the values of the active message conversion application state (704) to source stream messages to create application messages or may use the values of the active message conversion application state to perform administrative services. Often the active message conversion application state (704) includes calculated values derived from a series of source stream messages. In a financial market data environment, for example, the active message conversion application state may include values that represent the daily trading volume of a security, the highest price at which a security traded for the day, or the lowest price at which a security traded for the day.

In the example of FIG. 7, the backup feed adapter state (416) includes a backup message conversion application state (706) of a backup message conversion application of the backup feed adapter. Similar to the active message conversion application state (704), the backup message conversion application state (706) represents an aggregation of values stored in computer memory of the backup feed adapter used by an backup message conversion application to convert source stream messages received in the feed adapter to application messages for transmission to the subscribing client device An example of a backup message conversion application may include the conversion module of the backup feed adapter discussed above with reference to FIG. 2.

In the method of FIG. 7, determining (424), by the backup feed adapter, whether the backup feed adapter state (416) is synchronized with the active feed adapter state (406) may be carried out by determining (700) whether the values for the active message conversion application state (704) match the values for the backup message conversion application state (706). Determining (700) whether the values for the active message conversion application state (704) match the values for the backup message conversion application state (706) according to the method of FIG. 7 may be carried out by receiving, by a backup message conversion application from the backup messaging middleware of a backup feed adapter, the active message conversion application state (704), and comparing, by the backup message conversion application, the values for the active message conversion application state (704) with the values for the backup message conversion application state (706). If the values for the active message conversion application state (704) are equal to the values for the backup message conversion application state (706), then the backup feed adapter state (416) is synchronized with the active feed adapter state (406). The backup feed adapter state (416) is not synchronized with the active feed adapter state (406) if the values for the active message conversion application state (704) are not equal to the values for the backup message conversion application state (706).

In the method of FIG. 7, administering (426), by the backup feed adapter, operation of the backup feed adapter in dependence upon whether the backup feed adapter state is synchronized with the active feed adapter state includes setting (702) the values for the backup message conversion application state (706) to match the values for the active message conversion application state (704) if the backup feed adapter state (416) is not synchronized with the active feed adapter state (406). Setting (702) the values for the backup message conversion application state (706) to match the values for the active message conversion application state (704) according to the method of FIG. 7 may be carried out by updating, by the backup message conversion application, the values of the backup message conversion application state (706) with the values of the active message conversion application state (704).

As mentioned above, some exemplary embodiments of the present invention may include a plurality of backup feed adapters in which each backup feed adapter is capable of transmitting backup application messages to the subscribing client device on a backup message stream. When one of the backup feed adapters repeatedly determines that the backup feed adapter state is not synchronized with the active feed adapter state, the backup messaging middleware of the backup feed adapter may operate to fail the backup feed adapter. That is, the backup messaging middleware of the backup feed adapter takes the backup feed adapter off-line so that the backup feed adapter is no longer available to provide redundancy. Often, however, another backup feed adapter is performing worse than the backup feed adapter whose backup feed adapter state is repeatedly out of sync with the active feed adapter state. The backup messaging middleware may, therefore, consider the health of the other backup feed adapters before failing the repeatedly unsynchronized backup feed adapter. For further explanation, therefore, FIG. 8 sets forth a flowchart illustrating a further exemplary method for synchronizing an active feed adapter and a backup feed adapter in a high speed, low latency data communications environment according to embodiments of the present invention that includes failing (806) one of the backup feed adapters in dependence upon the backup message conversion application health state (804) of each backup feed adapter (802) if the backup feed adapter state is not synchronized with the active feed adapter state.

Figure 8:
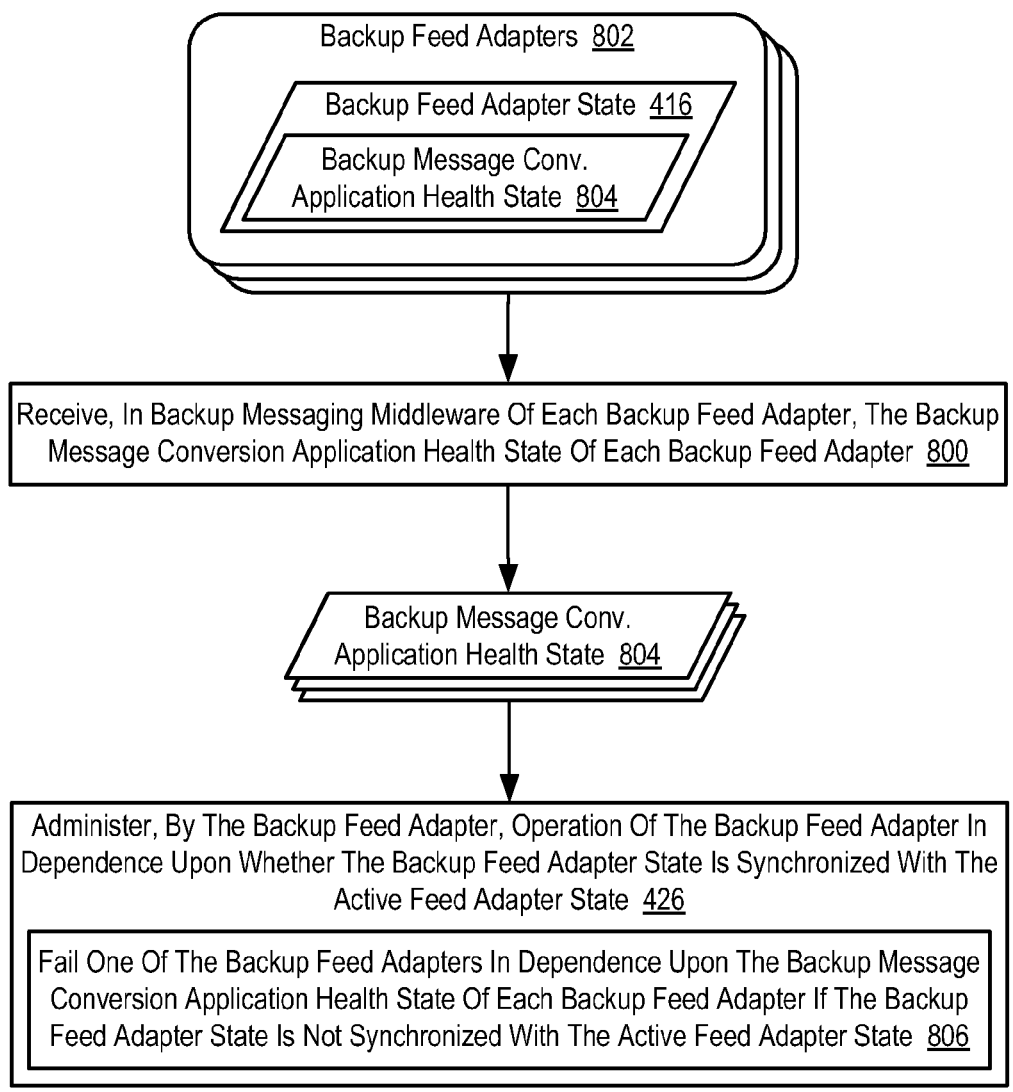
FIG. 8 sets forth a flowchart illustrating a further exemplary method for synchronizing an active feed adapter and a backup feed adapter in a high speed, low latency data communications environment according to exemplary embodiments of the present invention.

The example of FIG. 8 includes a plurality of backup feed adapters (802). Each backup feed adapter (802) represents a computer device having the capabilities of converting backup source stream messages on backup feed adapter source streams having a first format to backup application messages on a backup feed adapter output stream having a second format and transmitting the backup application messages to subscribing client devices on a backup message stream. Each backup feed adapter (802) is characterized by a backup feed adapter state (416). As mentioned above, the backup feed adapter state (416) represents an aggregation of values in computer memory that a backup feed adapter uses to perform data processing at any given moment.

The backup feed adapter state (416) of FIG. 8 includes a backup message conversion application health state (804). The backup message conversion application health state (804) represents one or more metrics of the backup feed adapter used by the backup feed adapter to evaluate the relative performance of the backup feed adapter compared to the other feed adapter. The backup message conversion application health state may be implemented as a measurement of the available computer memory on the backup feed adapter, the processor usage on the backup feed adapter, the error count for the backup feed adapter, message transmission rate for the backup feed adapter, or any other metric as will occur to those of skill in the art.

The method of FIG. 8 includes receiving (800), in backup messaging middleware of each backup feed adapter, the backup message conversion application health state (804) of each backup feed adapter (802). Receiving (800), in backup messaging middleware of each backup feed adapter, the backup message conversion application health state (804) of each backup feed adapter (802) may be carried out by retrieving, by the backup messaging middleware of each backup feed adapter (802), the backup message conversion application health state (804) from the backup message conversion application of the each backup feed adapter (802). The backup messaging middleware may retrieve the backup message conversion application health state (804) by calling a function exposed by an API of the backup message conversion application or by requesting the backup message conversion application health state (804) when polled by the backup message conversion application. Receiving (800), in backup messaging middleware of each backup feed adapter, the backup message conversion application health state (804) of each backup feed adapter (802) may further be carried out by transmitting, from the backup messaging middleware of each backup feed adapter (802) to the backup messaging middleware of the other backup feed adapters (802), the backup message conversion application health state (804) through a data communications channel implemented using, for example, member methods of an RMI object, member methods of a CORBA object, web services, or any other implementation as will occur to those of skill in the art.

In the method of FIG. 8, administering (426), by the backup feed adapter, operation of the backup feed adapter in dependence upon whether the backup feed adapter state is synchronized with the active feed adapter state includes failing (806) one of the backup feed adapters in dependence upon the backup message conversion application health state (804) of each backup feed adapter (802) if the backup feed adapter state is not synchronized with the active feed adapter state. Failing (806) one of the backup feed adapters in dependence upon the backup message conversion application health state (804) of each backup feed adapter (802) according to the method of FIG. 8 may be carried out by removing the backup feed adapter from communication with the messaging middleware of the other feed adapters if the value for the backup message conversion application health state (804) of the backup feed adapter being administered is the lowest among the backup message conversion application health states received from each of the other backup feed adapters.

Readers will note that removing the backup feed adapter from communication with the messaging middleware of the other feed adapters if the value for the backup message conversion application health state (804) of the backup feed adapter being administered is the lowest among the backup message conversion application health states received from each of the other backup feed adapters is for explanation and not for limitation. In fact, failing (806) one of the backup feed adapters in dependence upon the backup message conversion application health state (804) of each backup feed adapter (802) according to the method of FIG. 8 may also be carried out by removing the backup feed adapter from communication with the messaging middleware of the other feed adapters if the value for the backup message conversion application health state (804) of the backup feed adapter being administered is only lower than one of the values of the backup message conversion application health states received from the other backup feed adapters, or in any other manner as will occur to those of skill in the art.

In view of the explanations set forth above in this document, readers will recognize that practicing synchronization of an active feed adapter and a backup feed adapter in a high speed, low latency data communications environment to embodiments of the present invention provides the following benefits:

the time required to failover from an active feed adapter to a backup feed adapter is reduced from many seconds to a few milliseconds because the messages streams from the feed adapter remain synchronized, the data provided to subscribing client devices by redundant feed adapters is identical, and a backup feed adapter that is repeatedly out of sync with the active feed adapter is not failed if all the other backup feed adapters that exist are performing worse.

Exemplary embodiments of the present invention are described largely in the context of a fully functional computer system for synchronizing an active feed adapter and a backup feed adapter in a high speed, low latency data communications environment. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of synchronizing an active feed adapter and a backup feed adapter, the method comprising:

brokering, by a stream administration server, establishment of an active message stream to a subscribing client device from an active feed adapter;

brokering, by the stream administration server, establishment of a backup message stream to the subscribing client device from a backup feed adapter;

converting, by the active feed adapter, messages received from a feed source to generate the active message stream;

converting, by the backup feed adapter, messages received from the feed source to generate the backup message stream;

while the active feed adapter transmits the active message stream to the subscribing client device and the backup feed adapter transmits the backup message stream to the subscribing client device, the active feed adapter sending state data of the active feed adapter to the backup feed adapter, wherein the state data of the active feed adapter comprises an active message stream state characterized by an active message sequence number and an active source stream sequence number of the next message in the active message stream for transmission to the subscribing client device;

determining, by the backup feed adapter, whether the backup message stream is synchronized with the active message stream based, at least in part, on whether the state data of the active feed adapter corresponds to state data for the backup feed adapter, wherein the state data of the backup feed adapter comprises a backup message stream state characterized by a backup message sequence number and a backup source stream sequence number of the next message in the backup message stream for transmission to the subscribing client device, wherein said determining, by the backup feed adapter, whether the backup message stream is synchronized with the active message stream based, at least in part, on whether the state data of the active feed adapter corresponds to state data for the backup feed adapter comprises determining, by the backup feed adapter, whether a combination of the active message sequence number and the active source stream sequence number of the next message in the active message stream for transmission to the subscribing client device corresponds to the backup message sequence number and the backup source stream sequence number of the next message in the backup message stream for transmission to the subscribing client device; and administering, by the backup feed adapter, operation of the backup feed adapter in dependence upon whether the backup message stream is synchronized with the active message stream.

2. The method of claim 1 wherein, wherein said converting, by the active feed adapter, messages received from the feed source to generate the active message stream comprises the active adapter converting the messages received from the feed source from a first format into a second format;

wherein said converting, by the backup feed adapter, messages received from the feed source to generate the backup message stream comprises converting the messages received from the feed source from the first format to the second format.

3. The method of claim 1 wherein said administering operation of the backup feed adapter comprises reducing a backup stream transmission rate of the backup feed adapter if the backup feed adapter has previously transmitted a message in the backup message stream having a value for the backup source sequence number that matches the value for the active source sequence number of the active message stream state data.

4. The method of claim 1 wherein:

the state data of the active feed adapter also comprises an active message conversion application state of an active message conversion application of the active feed adapter;

the state data of the backup feed adapter also comprises a backup message conversion application state of a backup message conversion application of the backup feed adapter;

said determining whether the state data of the backup feed adapter corresponds to the state data of the active feed adapter state further comprises determining whether the active message conversion application state matches the backup message conversion application state; and said administering operation of the backup feed adapter comprises setting the backup message conversion application state to match the active message conversion application state if the state data of the backup feed adapter state does not correspond to the state data of the active feed adapter.

5. The method of claim 1 further comprising:

brokering, by the stream administration server, establishment of a set of one or more additional backup message streams to the subscribing client device from a set of one or more additional backup feed adapters;

receiving, from each backup feed adapter, a backup message conversion application health state of each other backup feed adapter;

wherein said administering operation of the backup feed adapter further comprises failing one of the backup feed adapters in dependence upon the backup message conversion application health state of each backup feed adapter if the state data of the backup feed adapter does not correspond to the state data of the active feed adapter.

6. Apparatus for synchronizing an active feed adapter and a backup feed adapter, the apparatus comprising one or more computer processors, one or more computer memories operatively coupled to the one or more computer processors, the one or more computer memories having disposed within them computer program instructions executable by the one or more computer processors to cause the apparatus to:

broker establishment of an active message stream to a subscribing client device from an active feed adapter;

broker establishment of a backup message stream to the subscribing client device from a backup feed adapter;

while the active feed adapter transmits the active message stream to the subscribing client device and the backup feed adapter transmits the backup message stream to the subscribing client device, cause the active feed adapter to send an active feed adapter state to the backup feed adapter, and the backup feed adapter to determine whether the backup message stream is synchronized with the active message stream based, at least in part, on the active feed adapter state and a backup feed adapter state, wherein the state data of the active feed adapter comprises an active message stream state characterized by an active message sequence number and an active source stream sequence number of the next message in the active message stream for transmission to the subscribing client device, wherein the state data of the backup feed adapter comprises a backup message stream state characterized by a backup message sequence number and a backup source stream sequence number of the next message in the backup message stream for transmission to the subscribing client device, wherein the computer program instructions executable to cause the apparatus to cause the backup feed adapter to determine whether the backup message stream is synchronized with the active message stream based, at least in part, on the state data of the active feed adapter and the state data for the backup feed adapter comprises the computer program instructions executable to cause the apparatus to cause the backup feed adapter to determine whether a combination of the active message sequence number and the active source stream sequence number of the next message in the active message stream for transmission to the subscribing client device corresponds to the backup message sequence number and the backup source stream sequence number of the next message in the backup message stream for transmission to the subscribing client device; and administer operation of the backup feed adapter in dependence upon whether the backup message stream is synchronized with the active message stream.

7. The apparatus of claim 6 wherein:

the computer program instructions executable to cause the apparatus to administer operations of the backup feed adapter comprises the computer program instructions executable to cause the apparatus to set the backup message stream state to match the active message stream state if the backup feed adapter state does not correspond to the active feed adapter state.

8. The apparatus of claim 6 wherein the computer program instructions executable to cause the apparatus to administer operation of the backup feed adapter comprises the computer program instructions executable to cause the apparatus to reduce a backup stream transmission rate of the backup feed adapter if the backup feed adapter has previously transmitted a backup application message having a value for the backup source sequence number that matches the value for an active source sequence number of the active message stream state.

9. The apparatus of claim 6 wherein:

the active feed adapter state further comprises an active message conversion application state of an active message conversion application of the active feed adapter;

the backup feed adapter state further comprises an backup message conversion application state of an backup message conversion application of the backup feed adapter;

determine whether the backup feed adapter state corresponds to the active feed adapter state comprises the computer program instructions executable to cause the apparatus to determine whether the active message conversion application state matches the backup message conversion application state; and the computer program instructions executable to cause the apparatus to administer operation of the backup feed adapter comprises computer program instructions executable to cause the apparatus to set the backup message conversion application state to match the active message conversion application state if the backup feed adapter state does not correspond to the active feed adapter state.

10. The apparatus of claim 6 wherein the computer program instructions further comprising computer program instructions executable to cause the apparatus to:

broker establishment of a set of one or more additional backup message streams to the subscribing client device from a set of one or more additional backup feed adapters;

direct the backup feed adapters to communicate their backup message conversion application health state to each other;

wherein the computer program instructions executable to cause the apparatus to administering operation of the backup feed adapter further comprises the computer program instructions executable to cause the apparatus to fail one of the backup feed adapters in dependence upon the backup message conversion application health state of each backup feed adapter if the backup feed adapter state does not correspond to the active feed adapter state.

11. A computer program product for synchronizing an active feed adapter and a backup feed adapter, the computer program product disposed upon a non-transitory machine-readable, recordable medium, the computer program product comprising computer program instructions to:

broker establishment of an active message stream to a subscribing client device from an active feed adapter;

broker establishment of a backup message stream to the subscribing client device from a backup feed adapter;

while the active feed adapter transmits the active message stream to the subscribing client device and the backup feed adapter transmits the backup message stream to the subscribing client device, cause the active feed adapter to send an active feed adapter state to the backup feed adapter, and the backup feed adapter to determine whether the backup message stream is synchronized with the active message stream based, at least in part, on the active feed adapter state and a backup feed adapter state, wherein the state data of the active feed adapter comprises an active message stream state characterized by an active message sequence number and an active source stream sequence number of the next message in the active message stream for transmission to the subscribing client device, wherein the state data of the backup feed adapter comprises a backup message stream state characterized by a backup message sequence number and a backup source stream sequence number of the next message in the backup message stream for transmission to the subscribing client device, wherein the computer program instructions to cause the backup feed adapter to determine whether the backup message stream is synchronized with the active message stream based, at least in part, on the state data of the active feed adapter and the state data for the backup feed adapter comprises computer program instructions to cause the backup feed adapter to determine whether a combination of the active message sequence number and the active source stream sequence number of the next message in the active message stream for transmission to the subscribing client device corresponds to the backup message sequence number and the backup source stream sequence number of the next message in the backup message stream for transmission to the subscribing client device; and administer operation of the backup feed adapter in dependence upon whether the backup message stream is synchronized with the active message stream.

12. The computer program product of claim 11 wherein:
the computer program instructions to administer operations of the backup feed adapter comprises computer program instructions to set the backup message stream state to match the active message stream state if the backup feed adapter state does not correspond to the active feed adapter state.

13. The computer program product of claim 11 wherein the computer program instructions to administer operation of the backup feed adapter comprises computer program instructions to reduce a backup stream transmission rate of the backup feed adapter if the backup feed adapter has previously transmitted a backup application message having a value for the backup source sequence number that matches the value for an active source sequence number of the active message stream state.

14. The computer program product of claim 11 wherein:
the active feed adapter state further comprises an active message conversion application state of an active message conversion application of the active feed adapter;
the backup feed adapter state further comprises an backup message conversion application state of an backup message conversion application of the backup feed adapter;
the computer program instructions to determine whether the backup feed adapter state corresponds to the active feed adapter state comprises computer program instructions to determine whether the active message conversion application state matches the backup message conversion application state; and
the computer program instructions to administer operation of the backup feed adapter comprises computer program instructions to set the backup message conversion application state to match the active message conversion application state if the backup feed adapter state does not correspond to the active feed adapter state.

15. The computer program product of claim 11 wherein the computer program instructions further comprise computer program instructions to:
broker establishment of a set of one or more additional backup message streams to the subscribing client device from a set of one or more additional backup feed adapters;
direct the backup feed adapters to communicate their backup message conversion application health state to each other;
wherein the computer program instructions to administer operation of the backup feed adapter further comprises the computer program instructions to fail one of the backup feed adapters in dependence upon the backup message conversion application health state of each backup feed adapter if the backup feed adapter state does not correspond to the active feed adapter state.

* * * * *